United States Patent
Lewis, II et al.

(10) Patent No.: US 9,319,724 B2
(45) Date of Patent: Apr. 19, 2016

(54) FAVORITE MEDIA PROGRAM SCENES SYSTEMS AND METHODS

(71) Applicant: Verizon and Redbox Digital Entertainment Services, LLC, Basking Ridge, NJ (US)

(72) Inventors: Kirk M. Lewis, II, Arlington, TX (US); Brian F. Roberts, Dallas, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 0 days.

(21) Appl. No.: 13/781,574

(22) Filed: Feb. 28, 2013

(65) Prior Publication Data

US 2014/0245336 A1    Aug. 28, 2014

(51) Int. Cl.
*H04H 60/33* (2008.01)
*H04N 21/25* (2011.01)
*H04N 21/472* (2011.01)
*H04N 21/475* (2011.01)
*H04N 21/482* (2011.01)
*H04N 21/2668* (2011.01)
*H04N 21/442* (2011.01)
*H04N 21/845* (2011.01)

(52) U.S. Cl.
CPC ............ *H04N 21/252* (2013.01); *H04N 21/25* (2013.01); *H04N 21/251* (2013.01); *H04N 21/2668* (2013.01); *H04N 21/4755* (2013.01); *H04N 21/4756* (2013.01); *H04N 21/47214* (2013.01); *H04N 21/47217* (2013.01); *H04N 21/4826* (2013.01); *H04N 21/44222* (2013.01); *H04N 21/8456* (2013.01)

(58) Field of Classification Search
CPC ................ H04N 21/25; H04N 21/251; H04N 21/47217; H04N 21/4756; H04N 21/4826; H04N 21/252; H04N 21/8456
USPC .......................... 725/9, 10, 37, 13, 38, 44, 46
See application file for complete search history.

(56) References Cited

U.S. PATENT DOCUMENTS

| | | | |
|---|---|---|---|
| 2005/0283800 A1* | 12/2005 | Ellis et al. | 725/40 |
| 2009/0199251 A1* | 8/2009 | Badoiu | H04N 21/23109 725/105 |
| 2009/0235297 A1* | 9/2009 | Ferrone | 725/24 |
| 2010/0058377 A1* | 3/2010 | Grob et al. | 725/14 |
| 2010/0169927 A1* | 7/2010 | Yamaoka et al. | 725/46 |
| 2010/0229121 A1* | 9/2010 | Falchuk | 715/817 |
| 2010/0251295 A1* | 9/2010 | Amento et al. | 725/38 |
| 2011/0052146 A1* | 3/2011 | Murthy et al. | 386/243 |
| 2011/0154405 A1* | 6/2011 | Isaias | 725/53 |

* cited by examiner

Primary Examiner — Jeremy Duffield

(57) ABSTRACT

An exemplary method includes a media program distribution service system 1) receiving data representative of a plurality of scene tags specifying one or more media program scenes tagged by a plurality of end users of a media program distribution service, 2) aggregating the plurality of scene tags, 3) determining, based on a favorite scenes determination heuristic and the aggregate scene tags, a set of one or more favorite scenes that are most popular among the plurality of end users of the media program distribution service, and 4) providing, based on the determined set of one or more favorite scenes, a favorite scene based feature of the media program distribution service. Corresponding systems and methods are also disclosed.

19 Claims, 20 Drawing Sheets

FAVORITE MEDIA PROGRAM SCENES SYSTEMS AND METHODS

BACKGROUND INFORMATION

There are diverse ways for people to find and consume media programs. For example, a person wanting to watch a movie may utilize a traditional video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

A video service typically provides a user of the service with tools for searching or browsing for video programs, consuming video programs, and otherwise interacting with the service. However, there remains room for new and/or improved tools and features that may further benefit users of the service, a provider of the service, and/or third parties such as content providers and/or advertisers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary favorite media program scenes systems and methods are disclosed herein. Certain systems and methods described herein may provide for user tagging of scenes of media programs, determination of favorite scenes of media programs based on the user tagging of the scenes, and one or more favorite scene based features of a media program distribution service. For example, certain systems and methods described herein may 1) provide one or more scene tagging tools configured to facilitate user tagging of media program scenes, 2) receive scene tags specifying media program scenes tagged by one or more end users of a media program distribution service, 3) aggregate the scene tags, 4) determine, based on the aggregate scene tags, a set of one or more favorite scenes of one or more media programs (e.g., a set of one or more favorite scenes that are most popular among end users of the media program distribution service), and 5) provide one or more favorite scene based features of the media program distribution service based on the determined set of one or more favorite scenes of the one or more media programs, such as described herein.

Additionally or alternatively, certain systems and methods described herein may provide for user tagging of scenes of media programs, analysis of attributes of user tagged scenes, and recommendation of one or more media programs based on the analysis of attributes of user tagged scenes. For example, certain systems and methods described herein may 1) provide one or more scene tagging tools configured to facilitate user tagging of media program scenes, 2) receive scene tags specifying media program scenes tagged by one or more end users of a media program distribution service, 3) analyze attributes of the user-tagged media program scenes, determine a media program recommendation based at least in part on the analysis, and 4) provide the media program recommendation to recommend a media program, such as described herein.

The systems and methods described herein may benefit end users of the media program distribution service, providers of media programs, a provider of the media program distribution service, advertisers, and/or one or more other entities. For example, one or more of the favorite scene based features of the media program distribution service and/or media program recommendations described herein may enhance user experiences with the media program distribution service and/or promotion of media programs and/or scenes of media programs within the media program distribution service based on interaction of end users with the media program distribution service.

Exemplary favorite media program scenes systems and methods will now be described in reference to the accompanying drawings.

Figure 1:
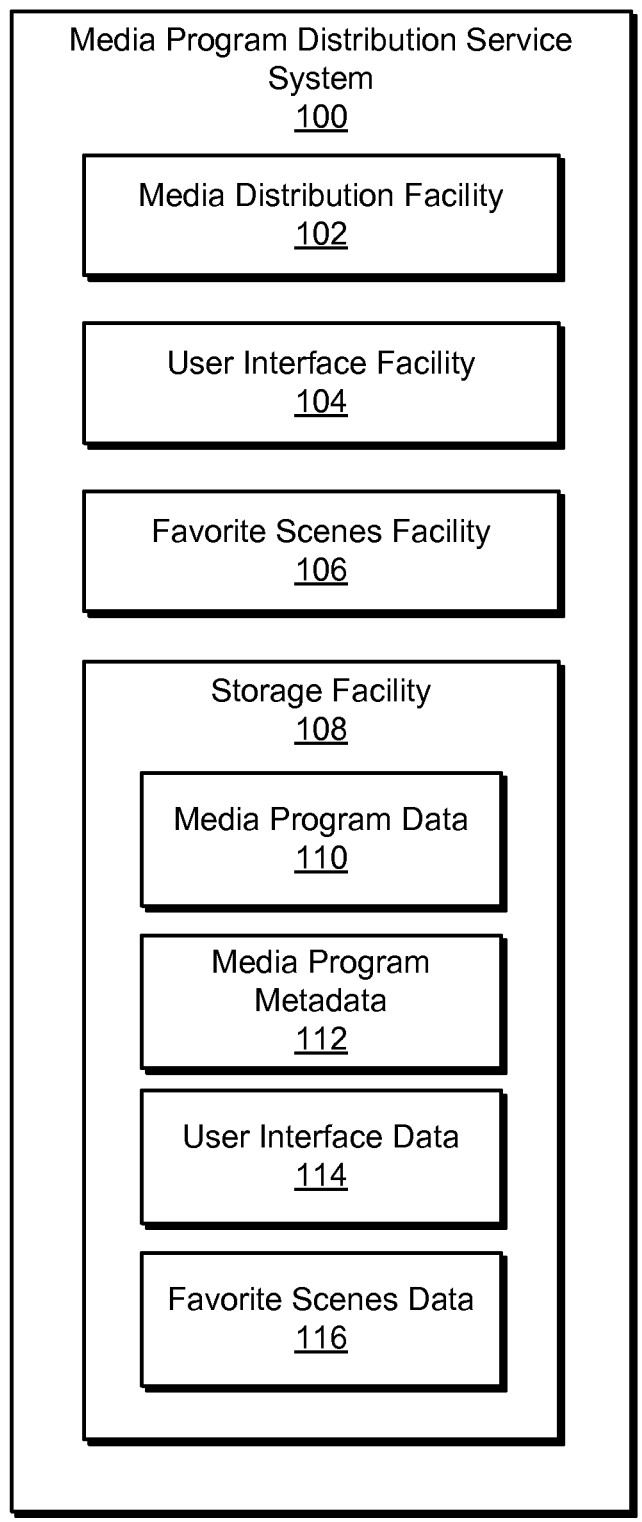
FIG. 1 illustrates an exemplary media program distribution service system according to principles described herein.

FIG. 1 illustrates an exemplary media program distribution service system 100 ("system 100"). System 100 may be configured to facilitate consumption of media programs by one or more users. For example, system 100 may be configured to provide a media program distribution service ("media service") to one or more end-users of the media service (e.g., one or more subscribers to the media service). System 100 may be associated with (e.g., operated by) a provider of the media service ("service provider"). Through the media service, an end user of the media service may discover and/or consume media programs distributed by system 100.

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of a media program distribution service. Such media programs that are made available for user consumption by the media program distribution service may be accessed and/or played back by an appropriately configured user computing device (e.g., a media player device) for presentation to the user.

As shown in FIG. 1, system 100 may include, without limitation, a media distribution facility 102, a user interface facility 104, a favorite scenes facility 106, and a storage facility 108 selectively and communicatively coupled to one another. The facilities may be communicatively coupled one to another by any suitable communication technologies.

Storage facility 108 may be configured to store media program data 110 representative of media programs that may be distributed by media distribution facility 102, media program metadata 112 descriptive of the media programs represented by media program data 110, user interface data 114 generated and/or used by user interface facility 104 to provide one or more user interfaces, and favorite scenes data 116 generated and/or used by favorite scenes facility 106, such as described herein. Storage facility 108 may maintain additional or alternative data as may serve a particular implementation.

Media distribution facility 102 may be configured to distribute media programs to users of a media service provided by system 100. Media distribution facility 102 may be configured to distribute media programs in any way and/or form that is suitable to facilitate consumption of the media programs by users of the media service. In certain examples, media distribution facility 102 may be configured to distribute physical copies of media programs to users of the media service. Additionally or alternatively, in certain examples, media distribution facility 102 may be configured to stream or download data representative of media programs over one or more networks (e.g., Internet Protocol ("IP") wide area networks such as the Internet).

Figure 2:
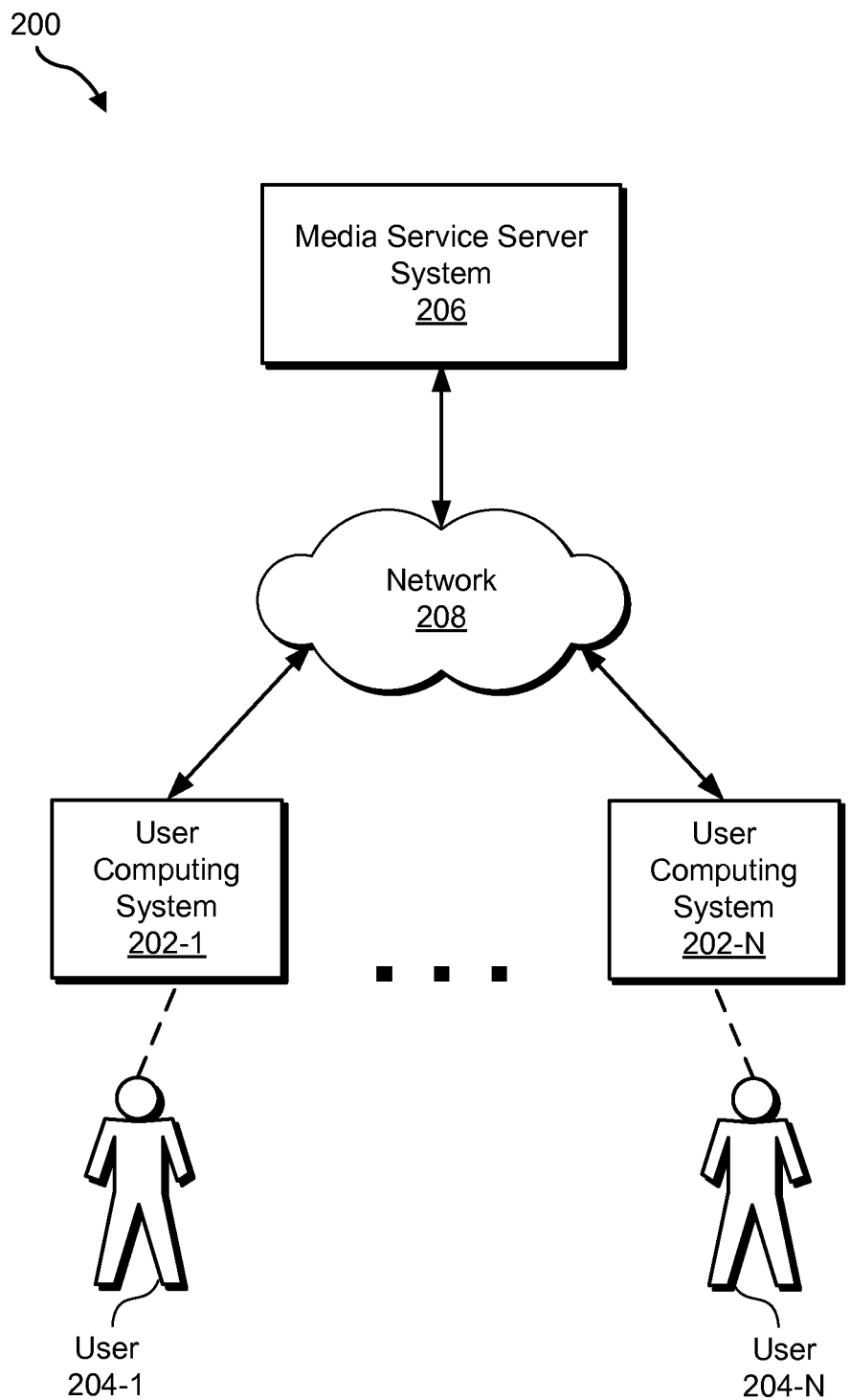
FIG. 2 illustrates an exemplary implementation of the system of FIG. 1 according to principles described herein.

FIG. 2 shows an exemplary implementation 200 of system 100. As shown, implementation 200 may include user computing systems 202 (e.g., user computing systems 202-1 through 202-N) respectively associated with users 204 (e.g., users 204-1 through 204-N), which may be end users of the media service provided by system 100. User computing systems 202 may be in communication with a media service server system 206 ("server system 206"), which may include one or more computing devices (e.g., server devices remotely located from user computing systems 202). In implementation 200, one or more of facilities 102-108 of system 100 may be implemented entirely by a user computing system 202, entirely by server system 206, or distributed across a user computing system 202 and server system 206 in any manner configured to facilitate a user 204 accessing the media service and/or media programs provided by system 100.

User computing systems 202 and server system 206 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 202 and server system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing systems 202 and server system 206. Communications between user computing systems 202 and server system 206 may be transported using any one of the above-listed networks, or any combination or sub-combination of the above-listed networks. Alternatively, user computing systems 202 and server system 206 may communicate in another way such as by direct connections between user computing systems 202 and server system 206.

Server system 206 may be configured to distribute media programs to user computing systems 202 for access and use by user computing systems 202 to present media programs for consumption by users 204. Server system 206 may distribute media programs to user computing systems 202 as part of the media service provided by system 100 and using any suitable media streaming and/or downloading technologies (e.g., Internet media streaming and/or downloading technologies). In certain examples, the media service may comprise an online media streaming service such as an Internet streaming video service, and server system 206 may be configured to stream media programs to user computing systems 202 by way of network 208.

A user computing system 202 may be configured for use by a user 204 associated with (e.g., operating) the user computing system 202 to access the media service provided by system 100. For example, the user 204 may utilize the user computing system 202 to access one or more user interfaces provided by system 100 as part of the media service, and to present the user interfaces for use by the user 204 to discover, access, and consume media programs distributed by server system 206 as part of the media service.

A user computing system 202 may include one or more user computing devices associated with a user 204. Examples of such devices include, without limitation, a media player computing device, a display device, a set-top box, a digital video recording ("DVR") device, a computer, a tablet computer, a smart phone device, and any other device capable of accessing the media service and/or media programs provided by system 100.

In certain examples, a user computing system 202 may include a first user computing device (e.g., a primary display device) configured to play back a media program and a second user computing device (e.g., a secondary or companion display device) configured to display a graphical user interface that may compliment or be used together with the playback of the media program by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 202 may include any combination of user computing devices or a single user computing device configured to perform any of the user computing system and/or device operations described herein.

Returning to FIG. 1, user interface facility 104 may be configured to provide a user interface through which users 204 may access and interface with the media service to discover, access, and consume media programs. The user interface may be in any suitable form. For example, user interface facility 104 may be configured to provide a website, a client application user interface (e.g., a user interface provided by a client application such as a "mobile app" installed and running on a user computing system 202), a media player user interface, and/or any other form of user interface configured to facilitate interaction with the media service. Accordingly, a user 204 of a user computing system 202 may utilize the user computing system 202 to access a user interface provided by user interface facility 104 in order to interact with the media service to discover, access, and/or consume media programs distributed as part of the media service.

User interface facility 104 may be configured to provide any of the exemplary user interfaces illustrated herein, including one or more user interfaces that include one or more favorite scene tools and/or favorite scene based features. Accordingly, a user 204 may access and/or use the tools and/or features through the user interface(s). Examples of favorite scene tools and/or favorite scene based features in user interfaces are described herein.

Favorite scenes facility 106 may be configured to perform one or more of the favorite scene operations described herein. In certain examples, favorite scenes facility 106 may interact with user interface facility 104 in any suitable way to perform such operations by way of one or more user interfaces provided by user interface facility 104.

Figure 3:
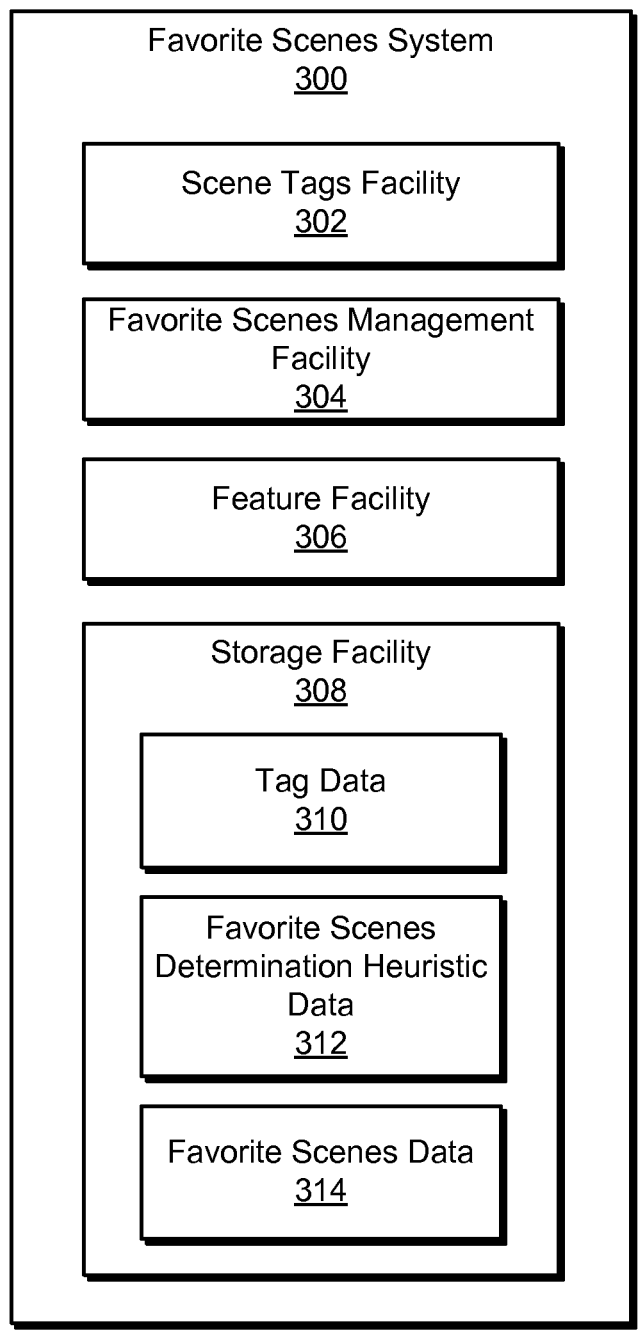
FIG. 3 illustrates an exemplary favorite scenes system according to principles described herein.

To this end, favorite scenes facility 106 and/or user interface facility 104 may implement a favorite scenes system configured to perform one or more of the favorite scene operations described herein. FIG. 3 illustrates an exemplary favorite scenes system 300 ("system 300"). As shown, system 300 may include, without limitation, a scene tags facility 302 ("tag facility 302"), a favorite scenes management facility 304 ("management facility 304"), a feature facility 306, and a storage facility 308 selectively and communicatively coupled to one another. The facilities may be communicatively coupled one to another by any suitable communication technologies.

Storage facility 308 may be configured to maintain tag data 310 representative of scene tags that specify scenes of media programs that have been tagged by users, favorite scenes determination heuristic data 312 representative of a favorite scenes determination heuristic that specifies logic to be used by management facility 304 to determine one or more sets of favorite scenes of one or more media programs based on tag data 310, and favorite scenes data 314 representative of the one or more sets of favorite scenes determined by management facility 304. Storage facility 308 may maintain additional or alternative data as may serve a particular implementation.

Figure 4:
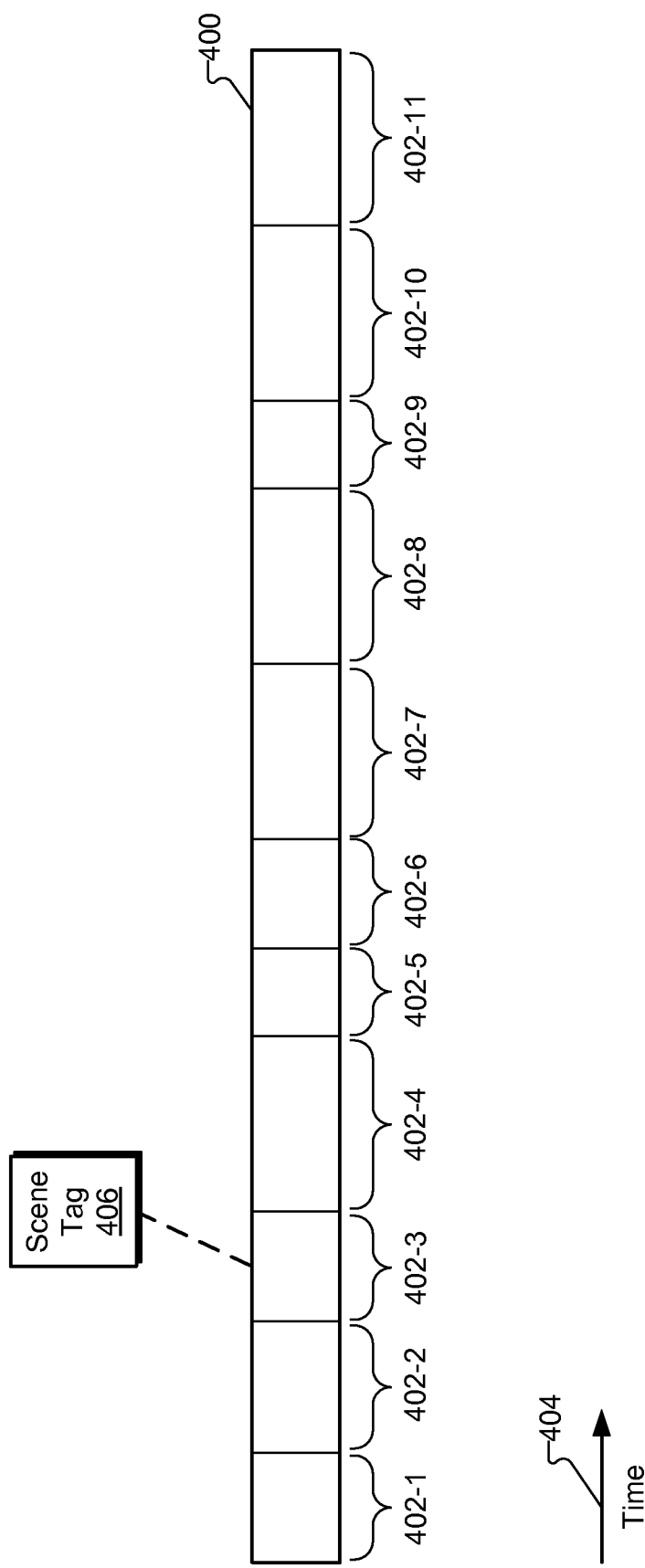
FIG. 4 illustrates an example of a tagged scene included in scenes of a media program according to principles described herein.

Tag facility 302 may provide one or more scene tagging tools configured to facilitate user tagging of scenes of media programs. As used herein, a "scene" of a media program (or "media program scene") may be any contiguous sub-segment of the media program. To illustrate, FIG. 4 shows an exemplary representation of a media program 400 that includes a plurality of scenes 402 (e.g., scenes 402-1 through 402-11) arranged sequentially as segments along a time axis 404.

When the media program 400 is played back (e.g., by a user computing system 202) from start to finish for experiencing by a user, the playback may begin with scene 402-1 and proceed sequentially through the remaining scenes 402-2 through 402-11 such that the scenes 402 are presented in order over time during the playback. Each of the scenes 402 may be of any suitable duration, as represented in FIG. 4 by the various segment lengths of the scenes 402 relative to the time axis 404.

Scenes 402 may be defined in any suitable way and/or by any suitable entity. For example, a provider of a media program, a provider of the media service, and/or end users of the media service may define scenes of the media program. For example, a media program provider and/or a media service provider may define scenes 402 of media program 400 in advance of user tagging of scenes 402. Additionally or alternatively, end users of the media service and/or the provider of the media service may define scenes 402 of media program 400 in conjunction with and/or based on user tagging of scenes 402.

The definition of a scene may include an identification of a start time and/or start frame and an end time and/or end frame for the scene. In certain examples, scenes may comprise defined chapter segments of a media program, such as content chapters of a movie that are defined by the provider of the movie and/or are accessible (e.g., as selectable menu options) in a chapter menu user interface.

In certain examples, scenes may be defined based on end user input. For instance, when a scene tags a scene of a media program, the user may provide input specifying a start and an end of the scene. Another user may tag a scene of the media program and provide input specifying a different start and/or end of the scene, and so on. Tag facility 302 may be configured to normalize tagged scenes having various start points and end points to define a set of uniform scenes of the media program. Additional user-tagged scenes may then be fit to the set of uniform scenes by tag facility 302.

In certain examples, the set of uniform scenes of a media program may be defined by the provider of the media service. User-tagged scenes may then be fit to the set of uniform scenes by tag facility 302.

These examples of scene definitions are illustrative only. Other scene definitions and/or ways of defining scenes of media programs may be used in other examples.

Figure 5:
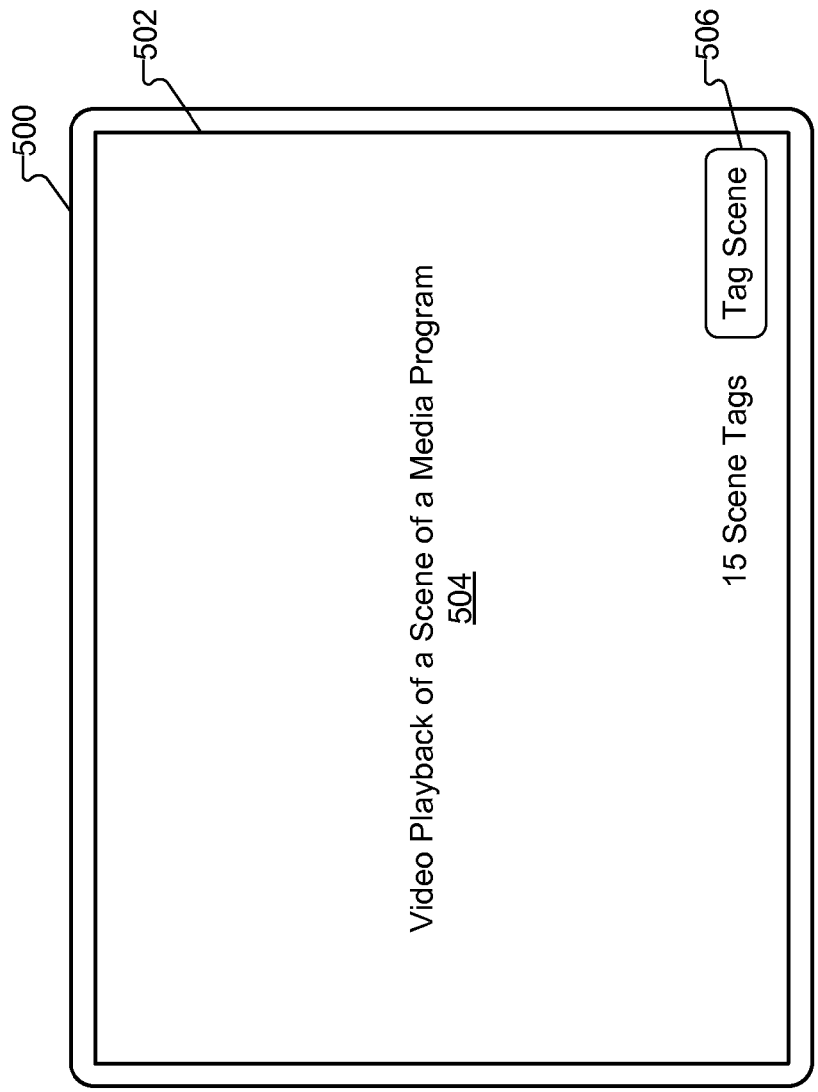
FIGS. 5-6 illustrate displays of exemplary graphical user interface views according to principles described herein.

As mentioned, tag facility 302 may provide one or more scene tagging tools configured to facilitate user tagging of scenes of media programs. A user may utilize a scene tagging tool provided by tag facility 302 to tag a scene of a media program (e.g., a scene 402 of media program 400). FIG. 4 indicates that scene 402-3 of media program 400 has been tagged by a user and is associated with a scene tag 406, which may represent the tagging of the scene 402-3 and include tag data associated with the scene 402-3 and/or the tagging of the scene 402-3. For example, scene tag 406 may include information identifying the scene 402-3 (e.g., a scene identifier, scene start time, scene start frame, scene end time, scene end frame, etc.), information identifying the user who tagged the scene 402-3 (e.g., a user identifier), information about the tagging of the scene 402-3 (e.g., a timestamp for the tagging, a tool identifier indicating a tool used for the tagging, etc.), and/or a comment, scene categorization, and/or label provided by the user who tagged the scene 402-3 (e.g., a comment descriptive of the scene 402-3). Scene tag 406 may additionally or alternatively include metadata descriptive of the scene and/or media program 400, information indicating a mood associated with the scene (e.g., a mood setting that was currently selected when the user tagged the scene), Examples of scene tagging tools that may be provided by tag facility 302 will now be described. In certain examples, a scene tagging tool may facilitate a user tagging a scene of a media program during playback of the scene. FIG. 5 illustrates an exemplary user computing device 500 displaying, on a display screen 502 of the user computing device 500, a graphical user interface that includes video playback 504 of a scene of a media program. During the playback 504, a user selectable scene tag button 506 may be concurrently displayed on the display screen 502, as illustrated in FIG. 5. To tag the scene being played back, a user may provide input to select the scene tag button 506 during playback of the scene. In response to a user selection of scene tag button 506, a scene tag representative of the tagging of the scene may be generated. Tag facility 302 may provide one or more additional user interface tools for use by the user to provide information to be included in the scene tag, such as a tool configured to facilitate the user providing a comment, category, and/or label for inclusion in the scene tag. To illustrate, the scene being played back may depict an explosion event, and the user may provide a scene tag comment, category, or label such as "Best explosion ever!"

The tool may allow the user to craft a custom comment, category, or label and/or to select a comment, category, or label from a menu of predefined comments, categories, or labels. For example, a label such as "Great Car Chases" may be defined by a user or by a provider of the media service and made available for selection by a user as a label for a tagged scene. In this manner, scene tags may be associated with uniform comments, categories, and/or labels, which may be used to provide one or more of the features of media service described herein.

Figure 6:
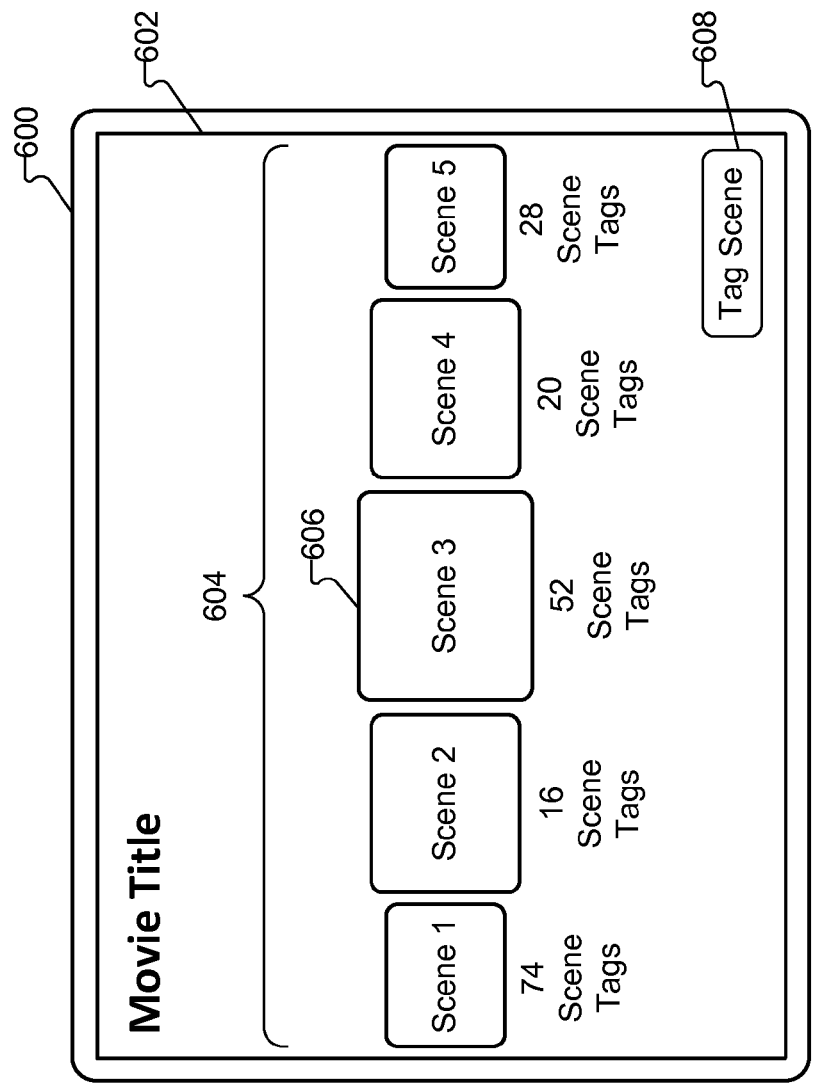

In certain examples, a scene tagging tool may facilitate a user navigating data representative of scenes of one or more media programs (e.g., thumbnail images representing the scenes) and tagging a scene of a media program to which the user has navigated. FIG. 6 illustrates an exemplary user computing device 600 displaying, on a display screen 602 of the user computing device 600, a graphical user interface that includes a menu 604 of scenes included in a media program such as a movie. A user may navigate the menu 604 such that different subsets of scenes of the movie are represented on-screen at any given moment. FIG. 6 shows a menu object 606 that represents a scene labeled "Scene 3" positioned at a central location within the graphical user interface, which may indicate that the scene labeled "Scene 3" is located at a selection position. To tag the "Scene 3" scene, a user may provide input to scroll the menu object 606 for the "Scene 3" scene to the central position as shown in FIG. 6 and then select a user selectable scene tagging button 608 that is displayed together with menu 604 on display screen 602. In response to a user selection of scene tag button 608, a scene tag representative of the tagging of the "Scene 3" scene may be generated. Tag facility 302 may provide one or more additional user interface tools for use by the user to provide information to be included in the scene tag, such as a tool configured to facilitate the user providing a comment, category, and/or label for inclusion in the scene tag, as described herein.

As shown in FIG. 5 and FIG. 6, information indicating a number of scene tags associated with a scene may be displayed for one or more of the scenes represented in the graphical user interfaces. In FIG. 5, information is displayed to indicate that the scene currently being played back in the graphical user interface has received fifteen scene tags. In FIG. 6, information is displayed to indicate the number of scene tags that have been received for each of the scenes represented in graphical user interface. The display of such information may help facilitate user tagging of one or more scenes to increase the number of scene tags received for the scene(s).

While FIG. 5 illustrates a scene tag button 506 and FIG. 6 illustrate a scene tag button 608 that may be selected by a user in a media program playback context and a menu context (e.g., a scene menu browsing context), respectively, to tag a select scene of a media program, these examples are illustrative only and not limiting. Additional or alternative scene tagging tools may be provided in additional or alternative contexts and may include tools that facilitate a user tagging a predefined scene of a media program and/or a user defining and tagging an end-user-defined scene of a media program. Thus, a user may utilize one or more tools provided by tag facility 302 to tag a scene of a media program in any suitable way.

In certain examples, one or more of the scene tagging tools provided by tag facility 302 may indicate to a user that the tool(s) may be used to tag a scene of a media program as a scene that is a favorite of and/or otherwise preferred by the user. For example, alternative implementations of buttons 506 and 608 may indicate that the buttons 506 and 608 may be selected to tag a scene as a favorite scene of the user. In other examples, alternative implementations of buttons 506 and 608 may indicate that the buttons 506 and 608 may be selected to cast a vote for a scene to be selected as a favorite scene among one or more users of the media service, such as described herein.

Figure 7:
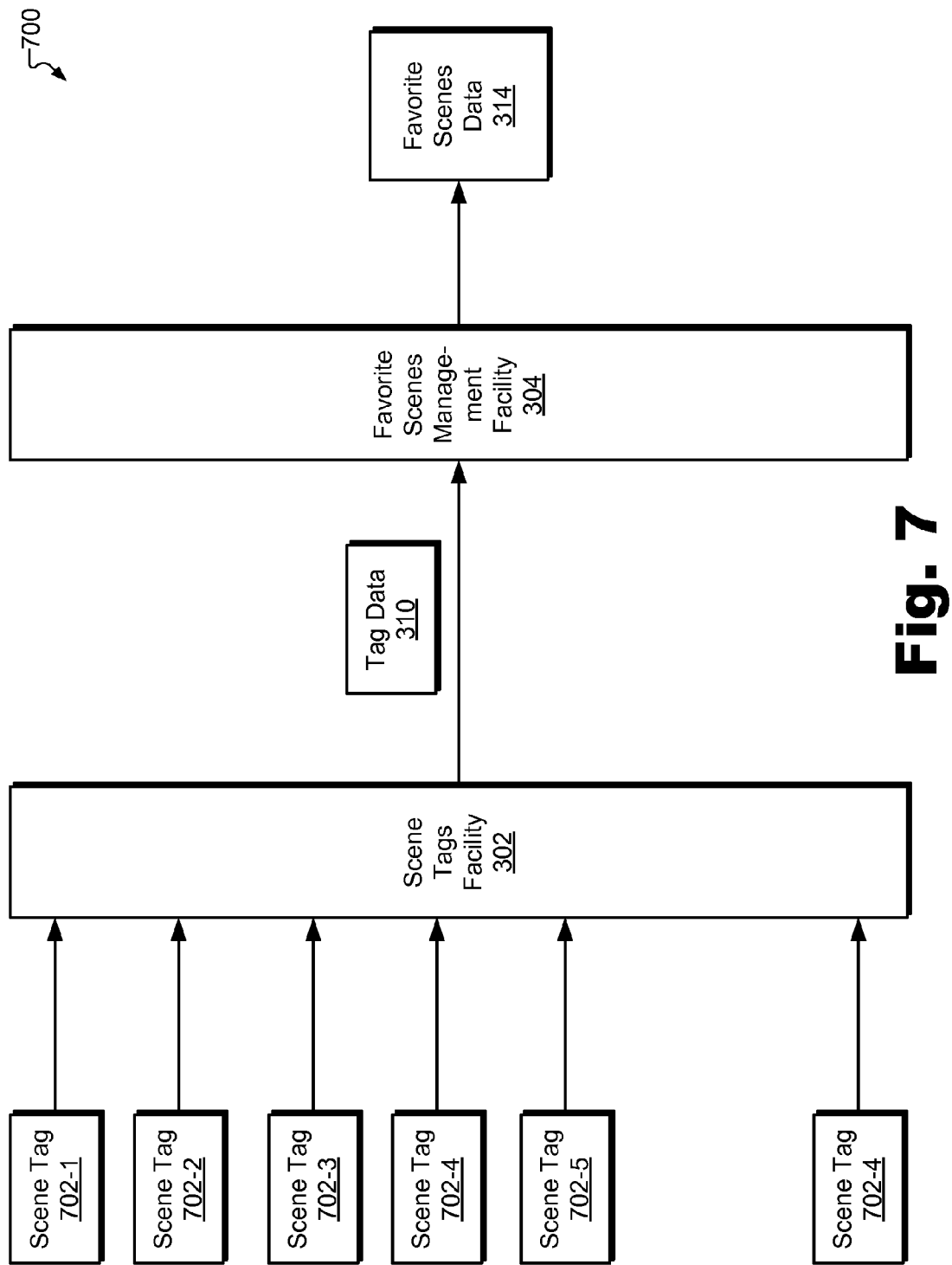
FIG. 7 illustrates an exemplary data flow according to principles described herein.

Tag facility 302 may receive, by way of the one or more scene tagging tools provided by tag facility 302, scene tags representing user tagging of scenes of media programs. Tag facility 302 may aggregate the received scene tags as tag data 310. For example, FIG. 7 illustrates an exemplary data flow configuration 700 in which tag facility 302 receives and aggregates a plurality of scene tags 702 (e.g., scene tags 702-1 through 702-N) as tag data 310 representing the aggregate scene tags 702. Tag facility 302 may receive and aggregate scene tags over time as scenes are tagged over time by users.

Tag facility 302 may aggregate scene tags specifying media program scenes tagged by a plurality of users in any suitable way. For example, the plurality of users may include any defined group of users, and tag facility 302 may aggregate scene tags into aggregate scene tags for the defined group of users. In certain examples, the plurality of users may include all users of the media service who have tagged at least one media program scene. In certain examples, the plurality of users may include a defined subset of the users of the media service, such as members of a movie club within the media service (e.g., a user-defined movie club). In certain examples, the plurality of users may include a group of friends as defined within the service or by a social networking service. These examples are illustrative only. Tag facility 302 may aggregate scene tags for any other defined group of users of the media service. Accordingly, tag data 310 may represent aggregate scene tags for any defined group of users of the media service.

Additionally or alternatively, tag facility 302 may aggregate scene tags into aggregate scene tags for any defined set of one or more media programs. In certain examples, the defined set may include a single media program, and tag facility 302 may aggregate scene tags specifying tagged scenes of the media program. In certain examples, the defined set may include media programs included in a category of media programs. Examples of such a category include, without limitation, a genre of media programs (e.g., comedy, action, drama, etc.), a category of media programs having a particular attribute such as a common actor, director, geographic setting, release date, rating, etc.), or any other defined category of media programs (e.g., "new releases," "classics," etc.). In certain examples, the defined set may include all media programs accessible as part of the media service. Tag facility 302 may aggregate scene tags for any other defined set of media programs. Accordingly, tag data 310 may represent aggregate scene tags for any defined set of one or more media programs.

Management facility 304 may be configured to process tag data 310 to determine a set of favorite scenes of one or more media programs and to generate favorite scenes data 314 that is representative of the set of favorite scenes. FIG. 7 illustrates management facility 304 generating favorite scenes data 314 based on tag data 310.

In certain examples, management facility 304 may perform the processing in accordance with a favorite scenes determination heuristic that is represented by heuristic data 312 and that specifies logic to be used by management facility 304 to determine, from aggregate scene tags represented by tag data 310, a set of one or more favorite scenes. Accordingly, management facility 304 may determine a set of one or more favorite scenes based on the favorite scenes determination heuristic and generate favorite scenes data 314 to represent the set of one or more favorite scenes. Examples of determining a set of favorite scenes from tag data 310 based on a favorite scenes determination heuristic will now be described.

In certain examples, the favorite scenes determination heuristic may specify logic to be used by management facility 304 to determine, from aggregate scene tags represented by tag data 310, a set of one or more favorite scenes that are most popular among a plurality of end users of the media service. Thus, the determined set of one or more favorite scenes may represent the most popular media program scenes among a group of end users of the media service (as compared to other media program scenes represented by tag data 310).

Figure 8:
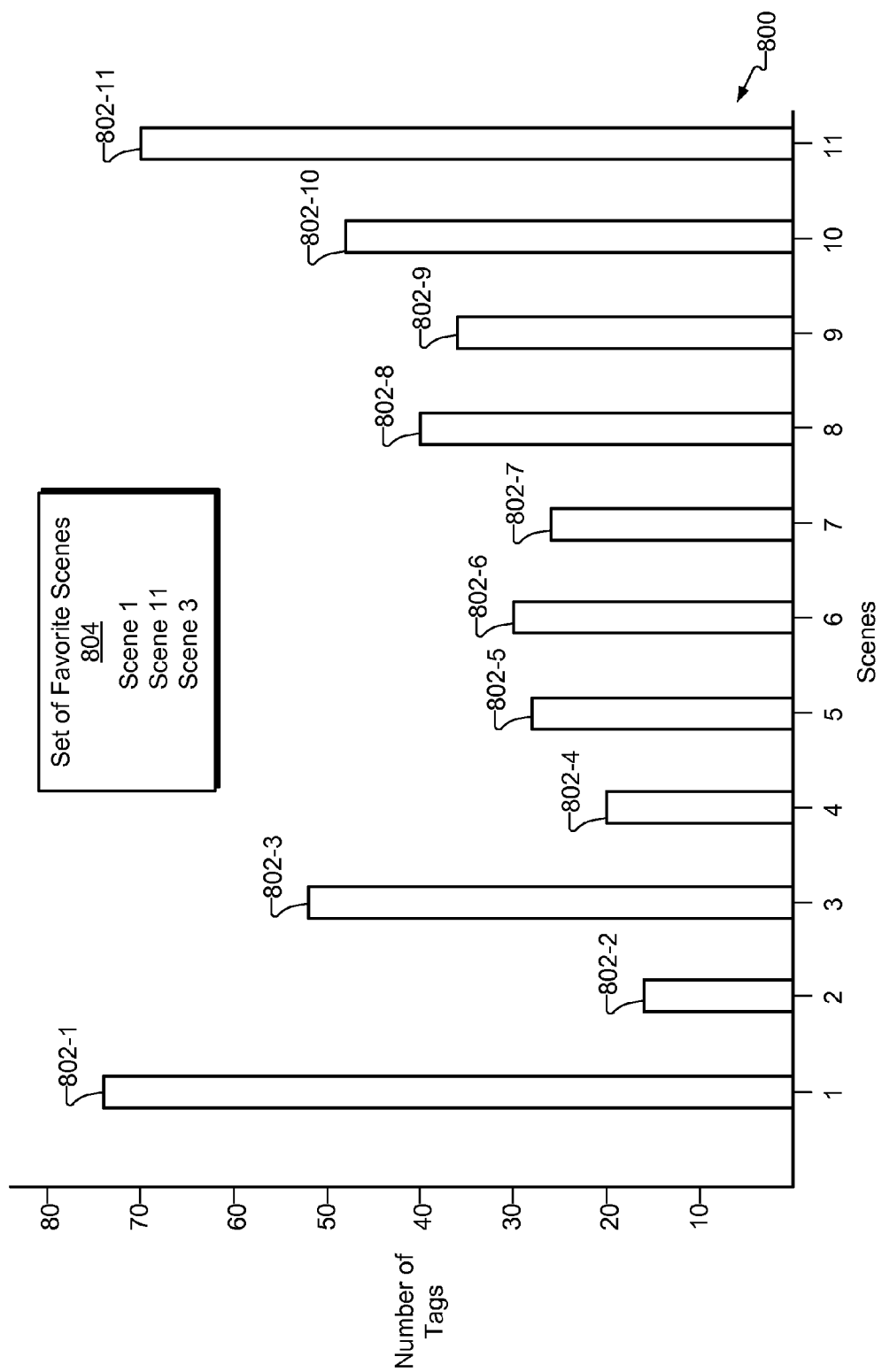
FIG. 8 illustrates a graph of an exemplary distribution of scene tags across a set of scenes according to principles described herein.

To this end, management facility 304 may be configured to treat each scene tag as a user vote for the scene specified by the scene tag and to process tag data 310 to determine a distribution of user votes across media program scenes. To illustrate, FIG. 8 shows a graph of an exemplary distribution 800 of user-provided scene tags (i.e., user votes) across a set of media program scenes. In the illustrated example, the set of scenes includes eleven scenes identified as scenes 1-11 along an x-axis of the graph. Bars 802 (e.g., 802-1 through 820-11) corresponding to the scenes and extending parallel to a y-axis that represents a number of scene tags indicate the numbers of scene tags that have been received for the scenes. For example, bar 802-1 indicates that seventy-four scene tags have been received for the scene labeled "Scene 1."

Based on the favorite scenes determination heuristic, management facility 304 may determine, from the distribution 800 of aggregate scene tags across the set of scenes represented in FIG. 8, a set of favorite scenes that are the most popular scenes within the set of scenes. As an example, the favorite scenes determination heuristic may specify a quantity of favorite scenes condition, such as a specific number of most popular scenes to be selected by management facility 304 for inclusion in the set of favorite scenes. For instance, the favorite scenes determination heuristic may specify that the top three most popular scenes be selected for inclusion in the set of favorite scenes. In this scenario, and as illustrated in FIG. 8, the scenes labeled scenes "1," "11," and "3" may be selected by management facility 304 as a set 804 of favorite scenes that are the three most popular scenes within the set of scenes.

The set 804 of favorite scenes may be determined to include different scenes than illustrated in FIG. 8 if the favorite scenes determination heuristic specifies a different number of most popular scenes to be selected by management facility 304. For instance, the favorite scenes determination heuristic may specify that only the most popular scene be selected for inclusion in the set of favorite scenes. In this scenario, only the scene labeled scene "1" may be selected by management facility 304 for inclusion in the set 804 of favorite scenes.

As another example, the favorite scenes determination heuristic may specify a maximum collective duration condition (e.g., a maximum playback time duration) for the most popular scenes to be selected by management facility 304 for inclusion in the set of favorite scenes. For instance, the favorite scenes determination heuristic may specify as many of the most popular scenes be selected that collectively have a duration that does not exceed a defined maximum duration. To illustrate, the favorite scenes determination heuristic may specify a maximum duration of three minutes, and management facility 304 may select and add the most popular scenes to a set of favorite scenes until the maximum duration will be exceeded by the playback time of the set of favorite scenes. For instance, with a maximum duration threshold of three minutes specified by the favorite scenes determination heuristic, management facility 304 may add the most popular scene, scene "1" having a duration of one minute and fifty seconds and the next most popular scene, scene "11" having a duration of one minute to the set of favorite scenes. Management facility 304 may determine not to add the next most popular scene, scene "3" because it has a duration that would cause the collective duration of the set to exceed the three minute maximum duration. In certain examples, management facility 304 may then determine that the set that includes scenes "1" and "11" is the finalized set of favorite scenes.

In other examples, management facility 304 may be configured to determine whether another scene, although less popular than scene "3," is of short enough duration to be added to the set of favorite scenes without causing the collective duration of the set of favorite scenes to exceed the maximum duration. For example, management facility 304 may step through the remaining scenes in decreasing order of popularity to look for a scene short enough in duration to fit within the set of favorite scenes. If such a scene is found, management facility 304 may add it to the set of favorite scenes.

As another example, the favorite scenes determination heuristic may specify a minimum number of votes condition (e.g., minimum number of scene tags) to be satisfied in order for a scene to qualify for selection by management facility 304 for inclusion in the set of favorite scenes. For instance, the favorite scenes determination heuristic may specify a minimum vote threshold of fifty votes. Any scenes having at least fifty votes are then eligible for selection by management facility 304 for inclusion in a set of favorite scenes. In FIG. 8, scenes "1," "11," and "3" each have more than fifty votes and are therefore eligible for selection, while the remaining scenes do not have sufficient votes to satisfy the threshold and are ineligible for selection. In certain examples, management facility 304 may be configured to automatically select all scenes that satisfy the minimum vote threshold for inclusion in a set of favorite scenes.

As another example, the favorite scenes determination heuristic may specify a time period condition to be considered by management facility 304 for selecting scenes for inclusion in a set of favorite scenes. For instance, the favorite scenes determination heuristic may specify that only recent user taggings of scenes are to be considered as votes for scenes. To illustrate, the favorite scenes determination heuristic may specify that only user taggings of scenes that occurred within the last week, day, or hour are to be considered as votes for scenes when determining the most popular scenes for inclusion in a set of favorite scenes. In some examples, the time period condition may be set such that only recent user votes are considered in real time or near real time such that the most popular scenes may be based on recent trends, which may allow currently trending favorite scenes to be determined by management facility 304 and used to provide a favorite scenes based "currently trending" feature of the media service.

The above-described examples of logic specified by the favorite scenes determination heuristic are illustrative only and not limiting. Additional or alternative logical conditions may be specified in other examples. In certain examples, any combination of the above-described logical conditions may be specified by the favorite scenes determination heuristic for use by management facility 304 to determine a set of favorite scenes of one or more media programs. For example, the favorite scenes determination heuristic may specify a maximum number of scenes to be included in a set and to consider only scenes having at least a minimum threshold number of votes for inclusion in the set.

Thus, in any of the ways described herein, media program scenes may democratically battle for popularity based on numbers of scene tags (i.e., votes) for the scenes and in accordance with logic specified by the favorite scenes determination heuristic.

Media program scenes from any set of media programs may battle for popularity based on scene tags. For example, scenes within a single media program may battle for popularity based on scene tags. To this end, management facility 304 may be configured to determine a set of one or more favorite scenes of the media program from among scenes of the media program. As another example, scenes within a plurality of media programs, such as all media programs associated with the media service or a defined subset of all of the media programs that share one or more common attributes (e.g., a common distribution time and/or channel, a common categorization such as a genre or theme, etc.), may battle for popularity based on scene tags. To this end, management facility 304 may be configured to determine a set of one or more favorite scenes of multiple media programs from among scenes of the multiple media programs, such as a set of favorite scenes across the media service.

Returning to FIG. 3, feature facility 306 may be configured to provide one or more features of a media service, including one or more favorite scene based features of the media service. A favorite scene based feature may include any feature of the media service the providing of which is based at least in part on or otherwise uses data included in or derived from scene tags. To this end, feature facility 306 may be configured to access and use tag data 310 and/or favorite scenes data 314 to provide one or more favorite scene based features of the media service. Examples of such favorite scene based features of the media service will now be described.

Feature facility 306 may be configured to provide one or more features that facilitate user access to favorite scenes represented by favorite scenes data 314. For example, feature facility 306 may provide one or more user interface tools configured to facilitate user access to favorite scenes, such as a set of favorite scenes determined to be most popular among a plurality of users as described above.

To illustrate, the set 804 of favorite scenes illustrated in FIG. 8 may include the three most popular scenes (scenes "1," "11," and "3") of a movie titled "Armageddon." Feature facility 306 may access and use data representative of the set 804 of favorite scenes to provide a favorite scene based feature that facilitates user access to the favorite scenes included in the set 804. For example, feature facility 306 may provide one or more user interface tools configured to facilitate user access to the favorite scenes included in the set 804.

Figure 9:
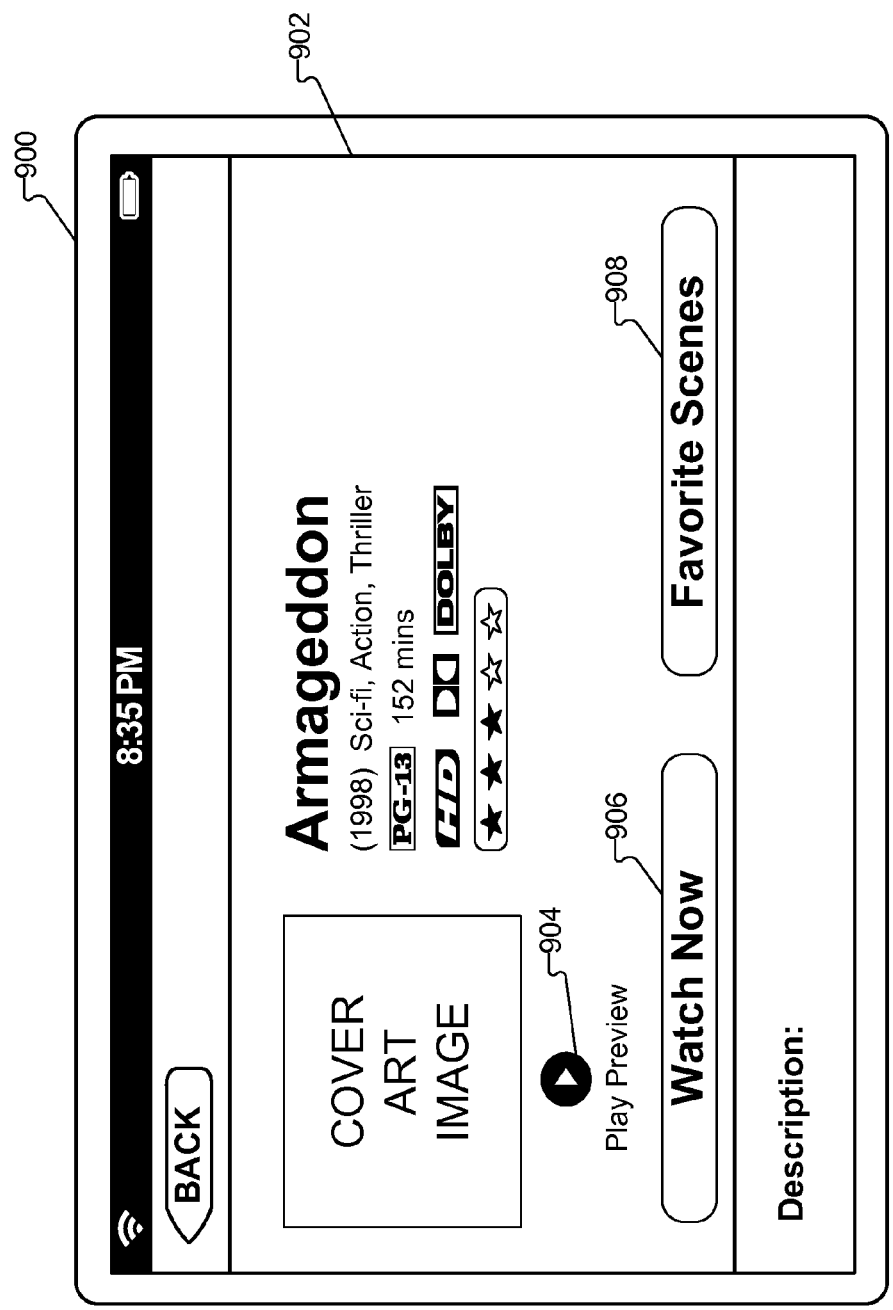
FIGS. 9-15 illustrate displays of exemplary graphical user interface views according to principles described herein.

As an example, FIG. 9 illustrates a user computing device 900 displaying a graphical user interface on a display screen 902 of the user computing device 900. As shown, the graphical user interface may include information and options associated with the movie titled "Armageddon." For instance, the graphical user interface may include a "play preview" option 904 configured to be selected by a user to initiate a playback of a preview (e.g., a trailer created by the movie producer) for the movie and a "watch now" option 906 configured to be selected by a user to initiate access and playback of the movie.

The graphical user interface may additionally or alternatively include a "favorite scenes" option 908 configured to be selected by a user. In certain examples, a user selection of option 908 may initiate playback of the set 804 of favorite scenes of the movie. For instance, the set 804 of favorite scenes of the movie may be played back as a playlist in any suitable order, such as in a chronological order within the movie or by order of popularity.

Figure 10:
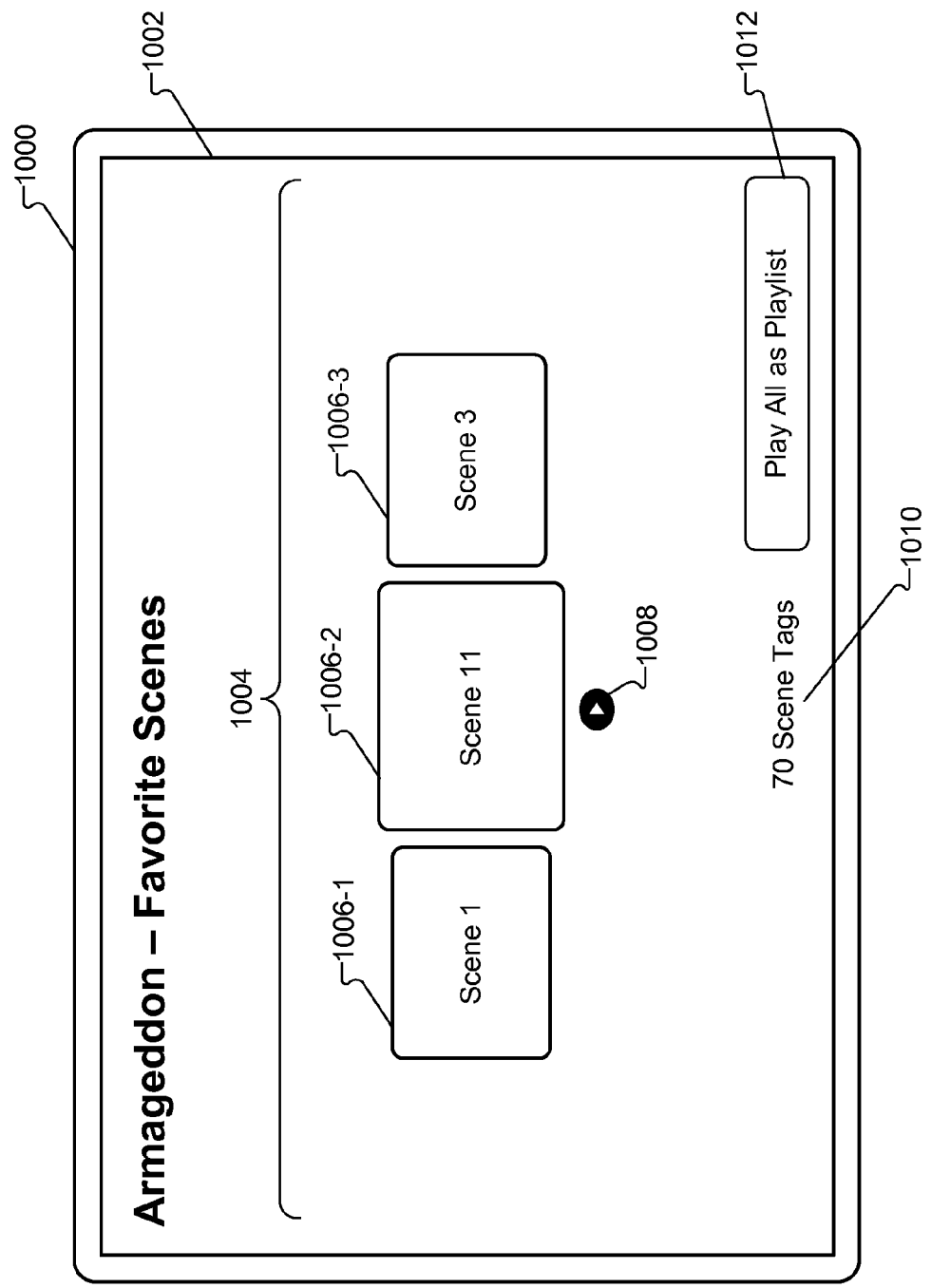

In other examples, a user selection of option 908 may initiate a launch of a favorite scenes menu. FIG. 10 illustrates a user computing device 1000 displaying, on a display screen 1002 of the user computing device 1000, a favorite scenes menu 1004. As shown, the menu 1004 may include a set of menu objects 1006 (e.g., menu objects 1006-1 through 1006-3) representing the favorite scenes included in the set 804 of favorite scenes of the "Armageddon" movie. The menu objects 1006 may be arranged to visually represent any order of the favorite scenes, such as a chronological order within the movie or by order of popularity.

A user may navigate the menu 1004 to position any of the menu objects 1006 at a central location within the menu 1004 at any given moment. FIG. 10 shows menu object 1006-2 that represents a favorite scene labeled "Scene 11" positioned at a central location within the menu 1004, which may indicate that the favorite scene labeled "Scene 11" is located at a selection position. With the "Scene 11" favorite scene located at the central position as shown, information and/or one or more options associated with "Scene 11" may be presented in the graphical user interface. For example, FIG. 10 illustrates a playback option 1008 configured to be selected by a user to initiate individual access and playback of "Scene 11." FIG. 10 also illustrates information 1010 indicating a number of scene tags (i.e., user votes) that have been received for "Scene 11."

Figure 11:
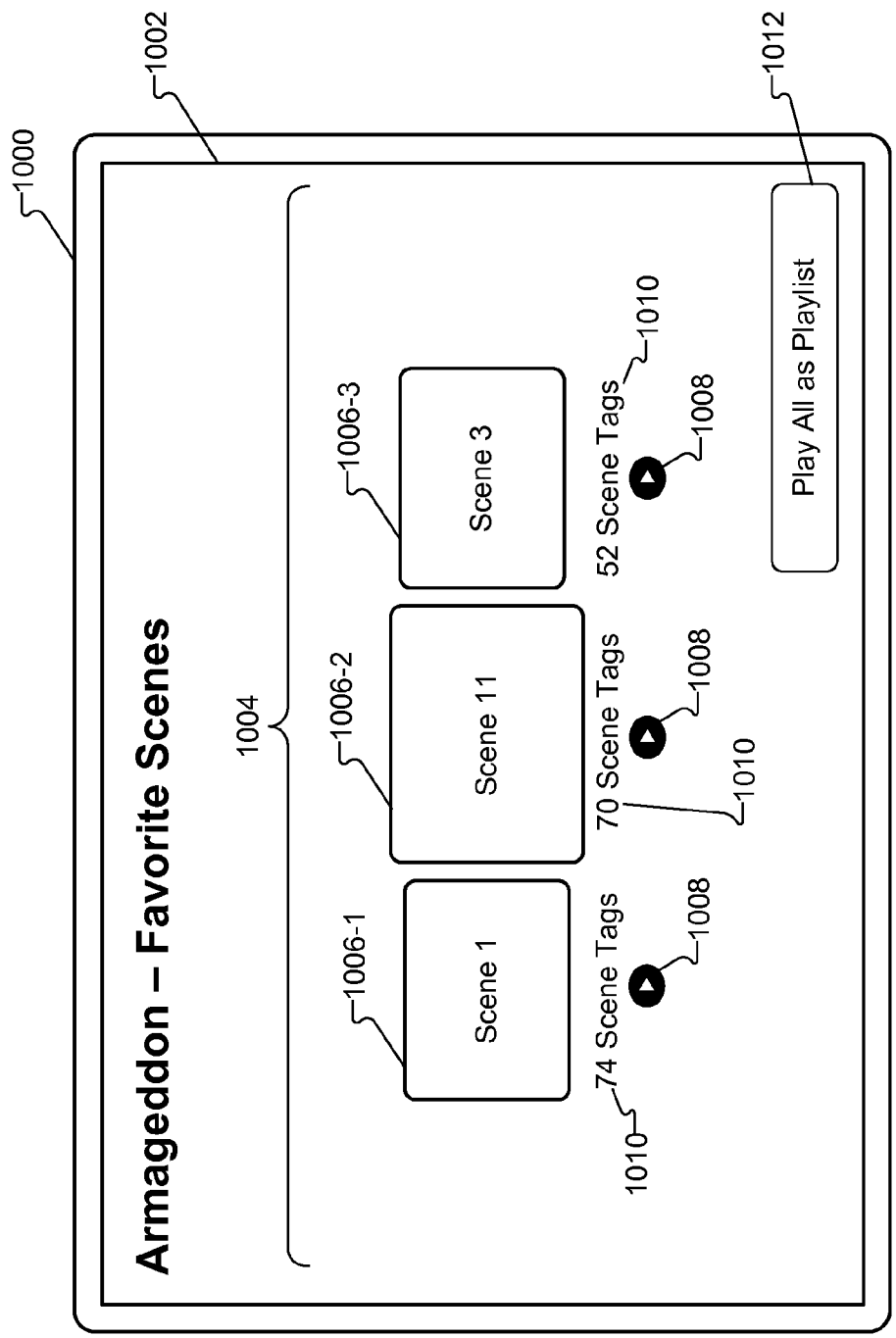

Alternative to displaying information and/or options only for a scene located in a selection position, information and/or options may be displayed for all of the favorite scenes represented on the display screen 1002. FIG. 11 illustrates an example in which a playback option 1008 and information 1010 indicating a number of scene tags that have been received are displayed for each of the favorite scenes represented in menu 1004.

As shown in FIG. 10 and FIG. 11, a graphical user interface view of menu 1004 may include a playlist playback option 1012, which may be configured to be selected by a user to initiate a playback of the favorite scenes included in the set 804 of favorite scenes of the "Armageddon" movie as a playlist. The playlist playback may include playing back all of the favorite scenes included in the set 804 in any suitable order, such as in a chronological order of the favorite scenes within the movie or by order of popularity. Feature facility 306 may be configured to generate the playlist from favorite scenes data 314 representing the set 804 of favorite scenes in any suitable way, such as by using an index to access the appropriate scenes of the "Armageddon" movie.

Figure 12:
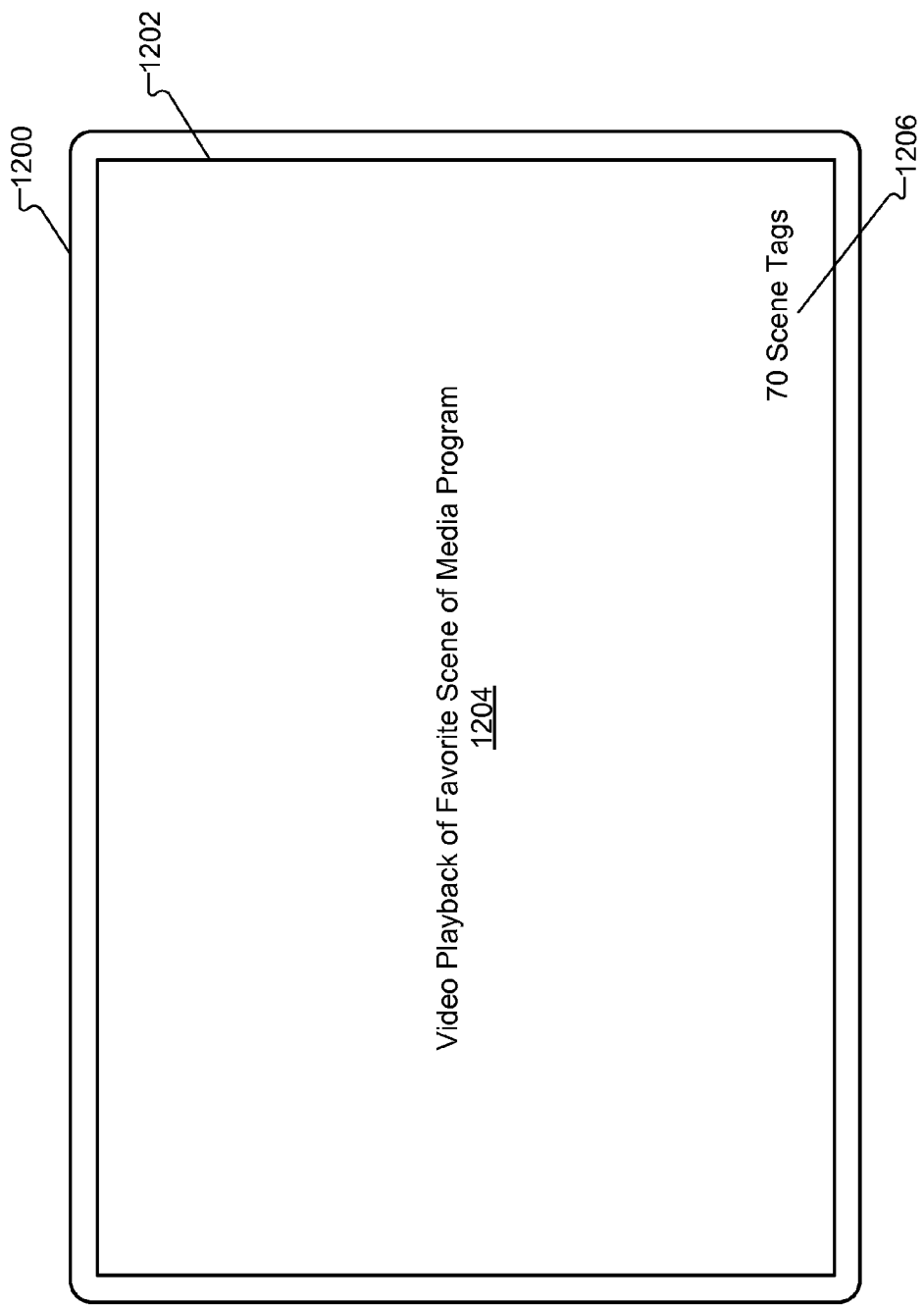

FIG. 12 illustrates a user computing device 1200 displaying, on a display screen 1202 of the user computing device 1200, a playback 1204 of a favorite scene of a media program. In some examples, the favorite scene of the media program (e.g., a favorite scene of the "Armageddon" movie) may be played back as an individual scene playback in response to a user selection of option 1008 or as part of a playlist playback of a set of favorite scenes in response to a user selection option 1012 shown in FIG. 10 and FIG. 11. In certain examples, information associated with the favorite scene being played back may be displayed together with the playback. For example, information 1206 indicating a number of scene tags (i.e., user votes) that have been received for the scene being played back may be displayed as shown in FIG. 12.

Figure 13:
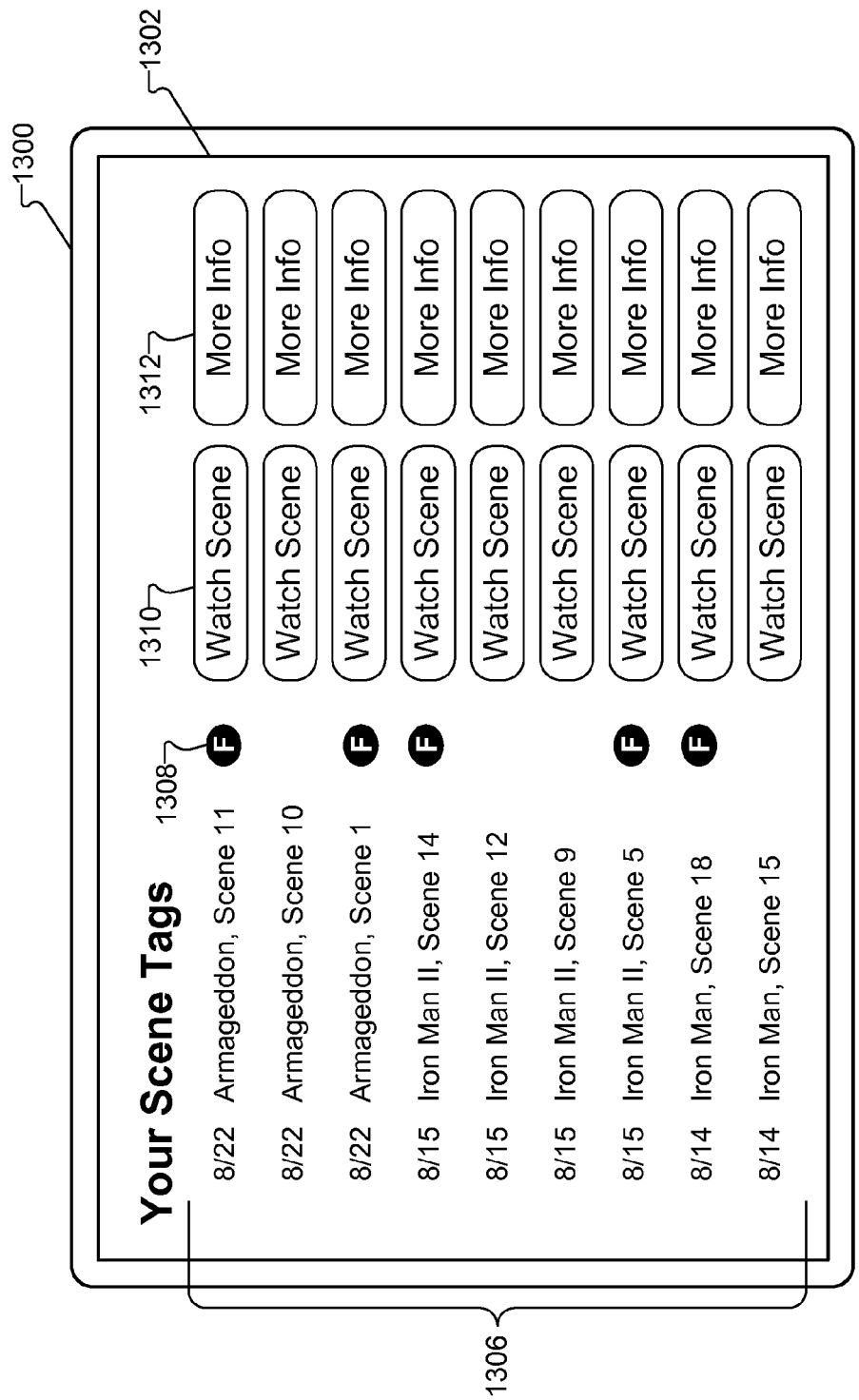

In certain examples, feature facility 306 may be configured to provide a user with access to a log of the scene tags provided by the user. From the log, the user may access a playback and/or information associated with scene tags provided by the user. To illustrate, FIG. 13 shows a user computing device 1300 displaying, on a display screen 1302 of the user computing device 1300, a graphical user interface view of a log of scene tags provided by a user. The graphical user interface view may include a list 1306 of scene tags that have been provided by a user. As shown, the list 1306 may indicate date and/or time information for the scene tags (e.g., dates that the scene tags were provided), identification information such as movie and/or scene information, favorite scene indicators indicating any scenes that belong to a set of favorite scenes determinate by management facility 304, and one or more user selectable options associated with the scene tags. For example, the first entry in the list indicates that the user tagged scene "11" of the "Armageddon" movie on August $22^{nd}$. The first entry also includes a favorite scene indicator 1308 indicating that that scene "11" of the "Armageddon" movie belongs to at least one set of favorite scenes determined by management facility 304. In some examples, the favorite scene indicator 1308 may be configured to be selected by a user to access information and/or options associated with any sets of favorite scenes to which the scene belongs. The first entry also includes a "watch scene" option 1310 configured to be selected by a user to initiate playback of the scene and a "more info" option 1312 configured to be selected by a user to access additional information and/or options associated with the scene tag, the scene, and/or the associated movie.

In certain examples, feature facility 306 may be configured to provide a user with access to scenes tags provided by one or more other users. For example, a first user may select a setting to allow scene tags provided by the user to be shared with users of the media service or with one or more specific users of the media service. Thereafter, a second user having permission to access the first user's scene tags may do so. For example, the second user may access a graphical user interface view similar to that shown in FIG. 13, where the list 1306 now contains information and/or options for scene tags provided by the first user.

In certain examples, feature facility 306 may be configured to provide one or more features that facilitate a user sharing a specific scene tag and/or set of favorite scene tags with another user. The sharing may be accomplished in any suitable way after the user provides input to initiate sharing of a specific scene tag and/or set of favorite scene tags with another user.

In certain examples, feature facility 306 may be configured to provide one or more scene playlist features. For example, feature facility 306 may be configured to provide one or more user interface tools configured for use by a user to create a playlist of scenes, such as a playlist that includes scenes tagged by the user and/or favorite scenes included in one or more sets of favorite scenes determined by management facility 304. As another example, feature facility 306 may be configured to automatically generate a playlist based on favorite scenes included in one or more sets of favorite scenes determined by management facility 304. The playlists may be shared with one or more users of media service in any of the ways described herein. These tools may allow a trailer for a movie to be created by a user or generated by feature facility 306 and shared with one or more users of the media service.

In addition or alternative to providing one or more user interface tools configured for use by a user to create, from tagged scenes, a playlist of scenes, feature facility 306 may provide one or more user interface tools configured for use by the user to manage a saved list of scene tags provided by the user. The user may use such tools to delete, order, and/or modify scene tags, such as by augmenting a previously created scene tag by adding a comment, label, and/or category to it.

In certain examples, feature facility 306 may be configured to compile a set of favorite scenes based on attributes of the scenes and/or tag data associated with the scenes. For example, feature facility 306 may be configured to compile a set of favorite scenes that all have a common comment, category, or label. For instance, feature facility 306 may compile scenes labeled "best car chases" into a set of favorite scenes associated with car chases.

In certain examples, feature facility 306 may be configured to provide a user with access to one or more sets of favorite scenes determined by management facility 304. The access may be provided in any suitable way, such as by way of one or more user interface tools. To illustrate one example, management facility 304 may determine a set of favorite scenes that includes the top three most popular scenes across the media service within the last week's time in any of the ways described herein. Feature facility 306 may provide a user with access to this set of favorite scenes, such as by providing an option in a graphical user interface, where the option is configured to be selected by the user to access information and/or options for the set of favorite scenes. For example, in response to a user selection of the option, feature facility 306 may be configured to provide a graphical user interface view that includes information and/or options for the set of favorite scenes.

Figure 14:
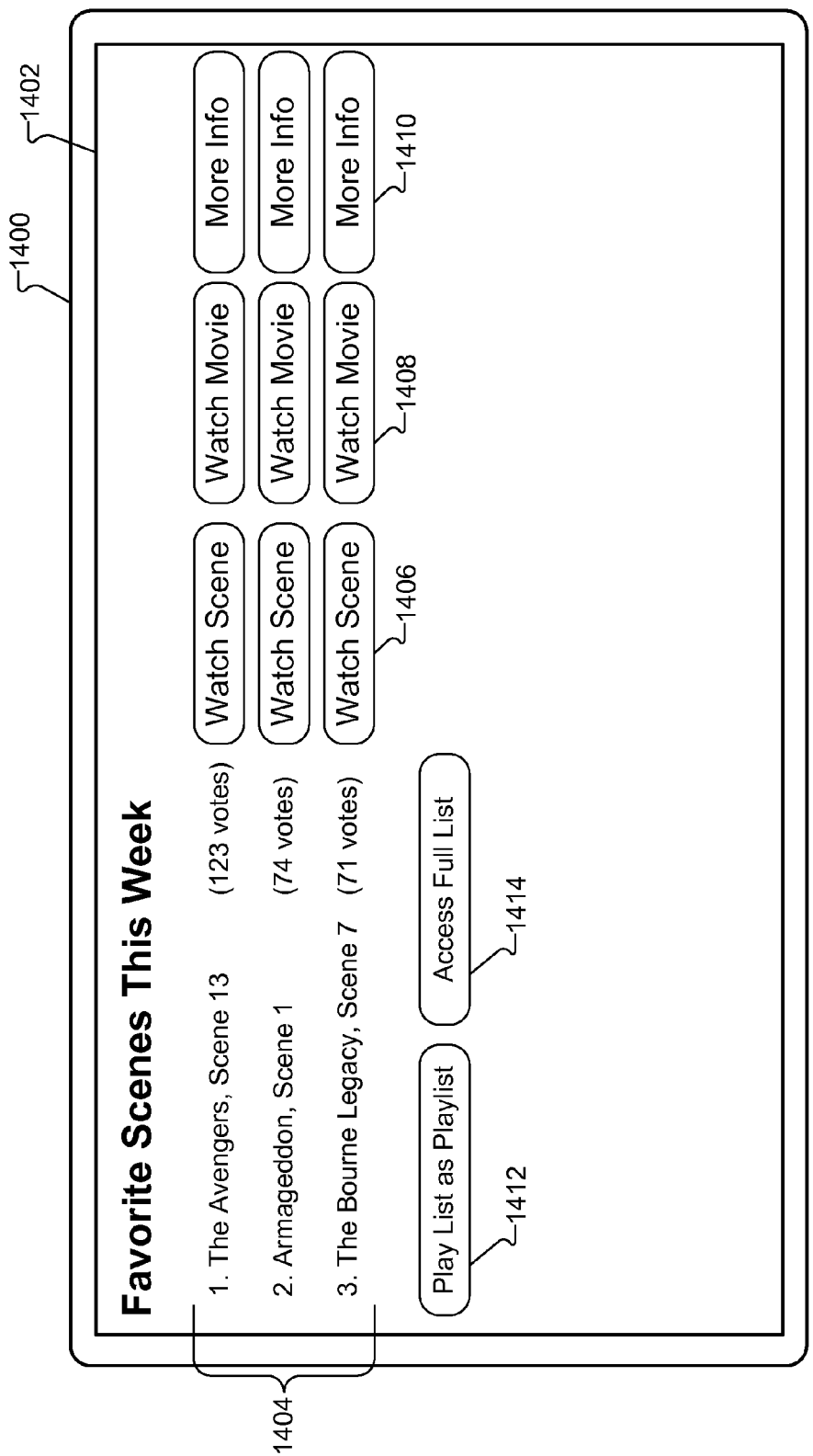

FIG. 14 illustrates such a graphical user interface view. As shown, FIG. 14 illustrates a user computing device 1400 displaying, on a display screen 1402 of the user computing device 1400, a graphical user interface view that includes a list 1404 of favorite scenes included in the set of favorite scenes that are most popular across the media service within the last week. As shown, list 1404 may include information identifying movie titles and particular scenes of the movie titles that are the top three favorite scenes of the week.

In addition, the graphical user interface view may include one or more options configured to be selected by a user to initiate playback of the favorite scenes, playback of the movies associated with the favorite scenes, and/or access to additional information and/or options related to the favorite scenes and/or associated movies. For example, option 1406 may be selected by a user to initiate playback of "Scene 7" of a movie titled "The Bourne Legacy," option 1408 may be selected by a user to initiate playback of the movie titled "The Bourne Legacy," and option 1410 may be selected by a user to launch a another graphical user interface view that includes additional information and/or options associated with "The Bourne Legacy" movie and/or "Scene 7" of "The Bourne Legacy" movie. In certain examples, the graphical user interface view illustrated in FIG. 14 may include an option 1412 configured to be selected by a user to initiate playback of the favorite scenes included in the list 1404 as a playlist of favorite scenes and/or an option 1414 configured to selected by a user to access a more comprehensive list of favorite scenes than the list 1404 shown in FIG. 14 (e.g., a list of the top ten or twenty-five favorite scenes for the week).

The above-described examples of favorite scene based features configured to facilitate user access to favorite scenes and/or information and/or options associated with the favorite scenes are illustrative only. Feature facility 306 may be configured to provide one or more other features configured to facilitate such access in other examples.

Feature facility 306 may be configured to provide one or more favorite scene based features that promote favorite scenes and/or media programs associated with the favorite scenes to one or more users and/or potential users of the media service. For example, favorites scenes that have been determined to be most popular among users of the media service as described above may be used by feature facility 306 to promote the favorite scenes and/or media programs that contain the favorite scenes.

Feature facility 306 may be configured to promote favorite scenes and/or associated media programs in any suitable way as a feature of the media service. For example, feature facility 306 may be configured to provide user interface promotional content that features and/or facilitates user access to the favorite scenes and/or associated media programs. The promotional content may be presented in a way that percolates information about and/or accessibility to the favorite scenes and/or associated content upward in the overall structure of a user interface of the media service. For instance, such promotional content may be presented within a top-level page within a graphical user interface hierarchy of pages, such as within a home page of a website and/or within a launch page of a client application user interface (e.g., a landing page of a mobile application user interface).

Figure 15:
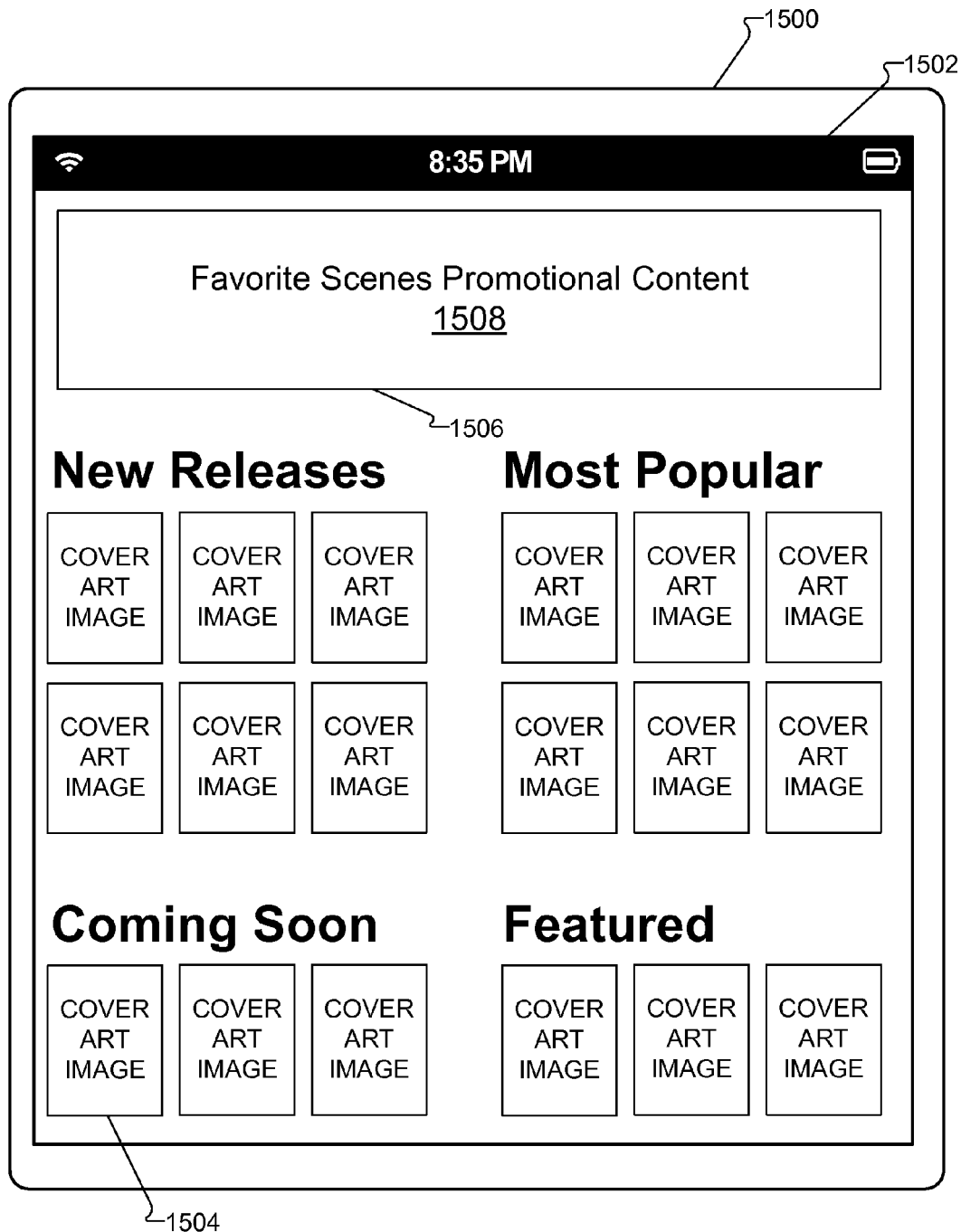

To illustrate, FIG. 15 shows a top-level page of a media service graphical user interface (e.g., a landing page) displayed on a display screen 1502 of a user computing device 1500. As shown, the illustrated page may include a top-level menu configured to facilitate user navigation and selection of media programs. The page may include menu objects representing media programs. For example, a menu object 1504 includes a cover art image representing a media program such as a particular movie. As shown, the menu objects may be organized into various categories, such as a "new releases" category that includes menu objects representing movies recently released within the media service, a "most popular" category that includes menu objects representing movies that are most popular within the media service based on movie access events (e.g., by number of access requests, downloads, streaming sessions, etc.), a "coming soon" category that includes menu objects representing movies that are scheduled for release within the media service in the near future, and a "featured" category that includes menu objects representing movies selected as featured movies within the media service. A user may navigate within the menu and select a menu object to access a corresponding media program and/or information and/or options associated with the media program. For example, in response to a user selection of a menu object, a graphical user interface view similar to that shown in FIG. 9 may be displayed.

FIG. 15 further illustrates that the top-level page may include a promotional area 1506 positioned prominently within the page (e.g., at or near the top of the page). Feature facility 306 may be configured to populate promotional area 1506 with promotional content, which may include favorite scenes promotional content 1508 configured to promote one or more favorite scenes and/or one or more media programs associated with the favorite scene(s).

Promotional content 1508 may include any content that may be presented within the promotional area 1506 of the page and that promotes favorite scenes and/or associated media programs. For example, promotional content 1508 may include information about favorite scenes, including information indicating favorite scenes and that the favorite scenes comprise the most popular scenes among users of the media service. In some examples, promotional content 1508 may include cover art images for favorite scenes and/or associated media programs. Additionally or alternatively, promotional content 1508 may include one or more options configured to be selected by a user to access the favorite scenes and/or associated media programs (e.g., playback of the favorite scenes and/or the media programs) or to access additional information and/or options associated with the favorite scenes and/or associated media programs.

To illustrate one example, promotional content 1508 may include a list of one or more of the most popular scenes across the media service. For instance, the list may include information and/or options for the top three favorite scenes based on user vote across the media service within a defined period of time (e.g., within a day or week). For example, the list 1404 illustrated in FIG. 14 may be displayed as promotional content 1508 within promotional area 1506. Thus, promotional content 1508 may notify a user of top favorite scenes and provide the user with convenient access to favorite scenes, media programs that contain the favorite scenes, and/or information and/or options associated with the favorite scenes.

To illustrate another example, promotional content 1508 may promote a particular movie that collectively contains the most favorite scenes or that contains scenes that have received the most collective user votes. For example, promotional content 1508 may include a banner ad for the movie.

The examples of promotional content 1508 described above are illustrative only. Other examples may include other information and/or options configured to promote one or more favorite scenes of one or more media programs.

Feature facility 306 may be configured to select favorite scenes for promotion in any suitable way. For example, feature facility 306 may access and use favorite scenes data 314 to identify a set of favorite scenes and to select, from the set, one or more of the favorite scenes to promote. To illustrate, management facility 304 may determine, based on scene tags received within the last week's time as described above, a set of favorite scenes that includes the most popular scenes across the entire media service and all categories of media programs. Feature facility 306 may be configured to access favorite scenes data 314 representative of the set of favorite scenes and to select, from the set, one or more favorite scenes to promote. For instance, feature facility 306 may select the top three most popular scenes within the set for promotion. Feature facility 306 may then promote the selected favorite scenes and/or associated media programs, such as described herein.

The above-described example of selecting one or more favorite scenes for promotion is illustrative only. Other sets of favorite scenes may be determined and other favorite scenes selected for promotion in other examples. For example, favorite scenes within a defined group of users, for a different time period, and/or within a defined media program category may be determined and/or selected for promotion in any of the ways described herein.

Feature facility 306 may be configured to provide one or more features of the media service that may include selecting and recommending media programs based on attributes of scenes tagged by users. For example, feature facility 306 may be configured to access data representative of a plurality of scene tags specifying one or more media program scenes tagged by one or users, analyze one or more attributes of the tagged scenes, determine a media program recommendation based on the analysis, and provide the media program recommendation to recommend a media program.

The scene tags accessed by the feature facility 306 may include a set of scene tags provided by a single user or a set of scene tags provided by multiple users. In certain examples, the scene tags may include a set of favorite scenes that have been determined by management facility 304 in any of the ways described herein.

An analysis of attributes of tagged scenes may include determining one or more attributes of tagged scenes that are prevalent among the scenes. For example, feature facility 306 may analyze attributes of tagged scenes to determine the tagged scenes indicate a tendency of one or more users to tag scenes of media programs that have a particular genre, include a particular actor, are directed by a particular director, are produced by a particular studio, relate to particular subject matter, and/or have any other particular attribute. To illustrate, feature facility 306 may identify, from an analysis of attributes of tagged scenes, a tendency of one or more users to tag scenes of media programs that are about superhuman powers. For instance, feature facility 306 may determine that there is prevalence, among tagged media program scenes, of scenes of media programs that involve fictional characters with superhuman powers, such as Superman, Batman, Spiderman, the Incredible Hulk, Thor, Iron Man, Captain America, and/or other such fictional characters.

Feature facility 306 may perform the analysis of attributes of tagged media program scenes in any suitable way, such as by accessing and analyzing metadata for the media programs and/or media program scenes. An analysis of such metadata may include an analysis of any form of metadata for the media programs and/or media program scenes, including metadata included in electronic program guide data and/or received from a service that provides electronic program guide data. Additionally or alternatively, the analysis may include an analysis of participatory metadata generated by one or more end users of the media service. Such participatory metadata may include any data included in scene tags, such as comments, categories, and/or labels included in the scene tags. As an example, the analysis may include determining overlapping comments, categories, and/or labels of scene tags. Accordingly, the analysis may support the user of user input based collaborative filtering to determine media program recommendations.

Based at least in part on an analysis of attributes of tagged media program scenes, feature facility 306 may determine a media program recommendation. The determination may be made in any suitable way and may include, without limitation, feature facility 306 searching for media programs that have one or more attributes similar to the one or more attributes analyzed by feature facility 306 (e.g., by searching for media programs that include one or more of the tagged scenes or one or more other scenes that have similar attributes), comparing attributes of media programs and/or media program scenes, and accessing and using media program access history and/or personalization data associated with one or more users.

As an example, feature facility 306 may identify, from an analysis of attributes of scenes tagged by a user, a tendency of the user to tag scenes of movies that are about superhuman powers. Based in this analysis, feature facility 306 may search for movies about superhuman powers. From the search, feature facility 306 may identify one or more such movies. Feature facility 306 may also use a media access history for the user to identify which of the identified movies have not yet been accessed by the user. For example, feature facility 306 may search for and identify a movie titled "Iron Man 2" as a movie that is about superhuman powers. Feature facility 306 may further determine, from an access history associated with the user, that the user has not accessed the "Iron Man 2" movie. Based on these determinations, feature facility 306 may determine the "Iron Man 2" movie to be a media program recommendation that feature facility 306 may provide to the user.

As another example, feature facility 306 may identify, from an analysis of attributes of scenes tagged by a first user, a tendency of the first user to tag scenes of movies that are about superhuman powers. In addition, feature facility 306 may identify, from an analysis of attributes of scenes tagged by a second user, a tendency of the second user to tag scenes of movies that are about superhuman powers. Feature facility 306 may determine that this common tendency is shared by the first and second users. In response, feature facility 306 may analyze media access histories of the users and use the analysis of the media access histories of the users to determine a media program recommendation to provide to one or both of the users.

Figure 16:
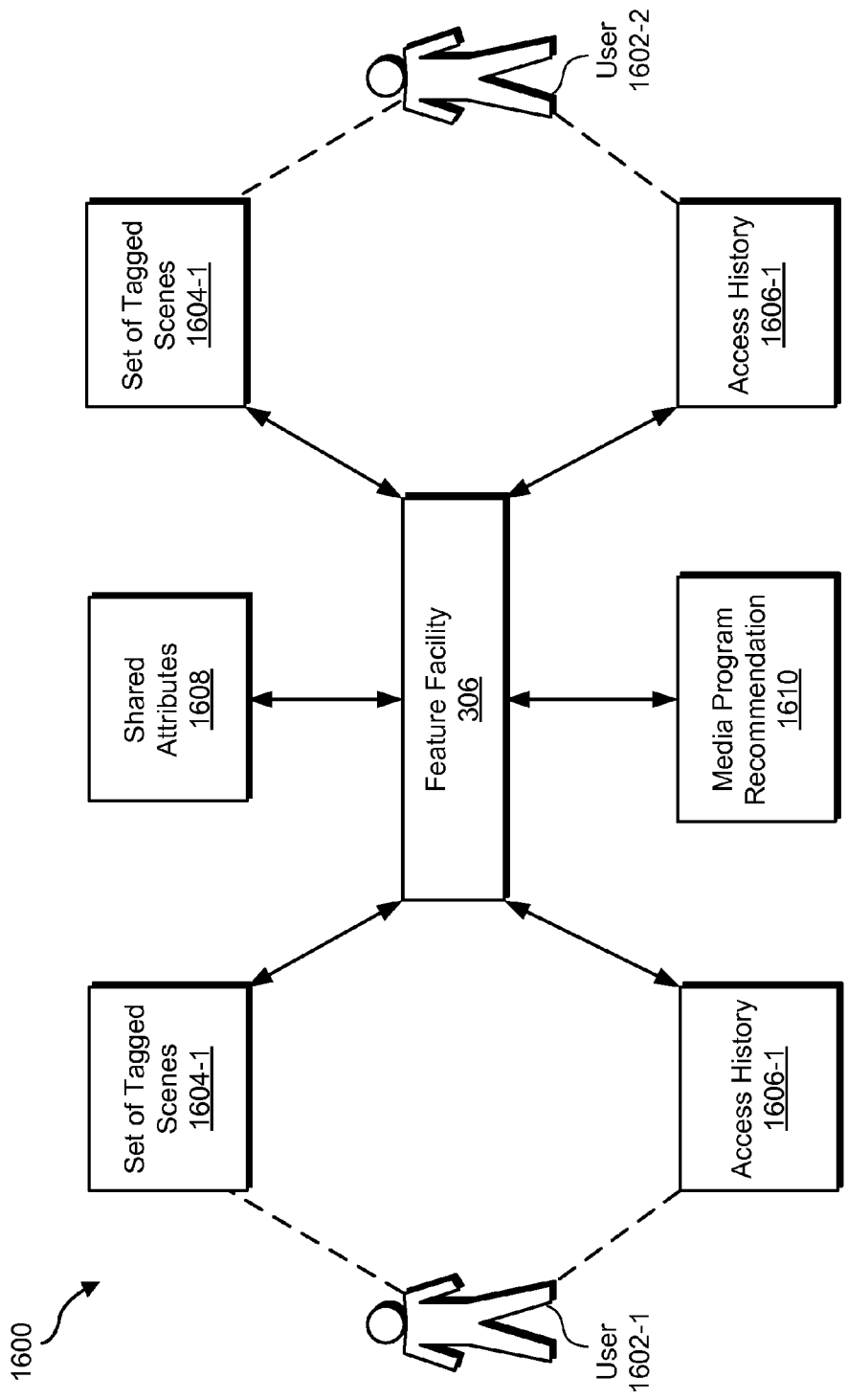
FIG. 16 illustrates a configuration 1600 in which a media program recommendation is generated according to principles described herein.

To illustrate, FIG. 16 shows a configuration 1600 in which a first user 1602-1 is associated with a first set of tagged scenes 1604-1 tagged by user 1602-1 and an access history 1606-1 representative of media programs accessed by user 1602-1. In addition, a second user 1602-2 is associated with a second set of tagged scenes tagged by user 1602-2 and an access history 1606-2 representative of media program accessed by user 1602-2. Feature facility 306 may access and use data representative of the set of tagged scenes 1604-1 and the set of tagged scenes 1604-2 to analyze scene tags provided by users 1602-1 and 1602-2. Based on the analysis, feature facility 306 may determine a set of one or more attributes 1608 of tagged scenes that are shared across the sets of tagged scenes 1604-1 and 1604-2. Feature facility 306 may then search access histories 1606-1 and 1606-2 based on the attributes 1608 to identify media programs that are included in the access histories 1606-1 and 1606-2 of users 1602-1 and 1602-2 that include the attributes 1608 (e.g., that include scenes having the attributes 1608).

Feature facility 306 may then compare the search results of searching access history 1606-1 to the search results of searching access history 1606-2 and identify any media programs that are included in one user's access history but not in the other user's access history. For example, feature facility 306 may determine that the access history 1606-1 of user 1602-1 includes a media program that includes the attributes 1608 and that is not included in the access history 1606-2 of user 1602-2. Feature facility 306 may identify this media program as a media program recommendation 1610 that may be made to user 1602-2.

To illustrate one example, feature facility 306 may determine, from analysis of the sets of tagged scene 1604-1 and 1604-2 that both users 1602-1 and 1602-2 have a tendency to tag scenes of movies about superhuman powers. Feature facility 306 may then search access histories 1606-1 and 1606-2 to determine, for each of users 1602-1 and 1602-2, a list of movies that are about superhuman powers that have been accessed by each user. Feature facility 306 may then compare the lists for the users 1602-1 and 1602-2 and identify any movies that are about superhuman powers that have been accessed by only one of the users 1602-1 and 1602-2. Feature facility 306 may then determine any such identified movies to be a media program recommendation 1610 that may be provided to the user who has not yet accessed the movies.

In certain examples, tagged scenes may be one component used to determine a media program recommendation. To this end, feature facility 306 may further base a determination of a media program recommendation on other data associated with one or more users. For example, feature facility 306 may further base a determination of a media program recommendation on data representative of content personalization logic configured for use to personalize content to a user, user demographics, and/or relationships between users (e.g., information specifying that users are members of the same defined group, information specifying a relationship status between users, etc.).

While certain examples described above are directed to feature facility 306 recommending media programs to a user based on sets of tagged scenes associated with individual users, this is illustrative only. As mentioned, feature facility 306 may be configured to recommend media programs to a user based on one or more sets of scenes tagged by a plurality of users, such as a defined group of users of the media service. For example, feature facility 306 may be configured to recommend media programs to a user based on attributes of a set of favorite scenes determined by management facility 304. To this end, feature facility 306 may be configured access and use favorite scenes data 314 to analyze information about scenes tagged by a plurality of users and to determine, based on the analysis, one or more media programs to recommend to the user.

For example, feature facility 306 may analyze information about a set of favorite scenes to determine that a group of users has tagged scenes of a number of movies that involve fictional characters with superhuman powers, such as Superman, Batman, Spiderman, the Incredible Hulk, Thor, Iron Man, and Captain America. From this determination, feature facility 306 may determine that the group of users collectively enjoys these types of movies and may identify and recommend similar movies to one or more users.

Figure 17:
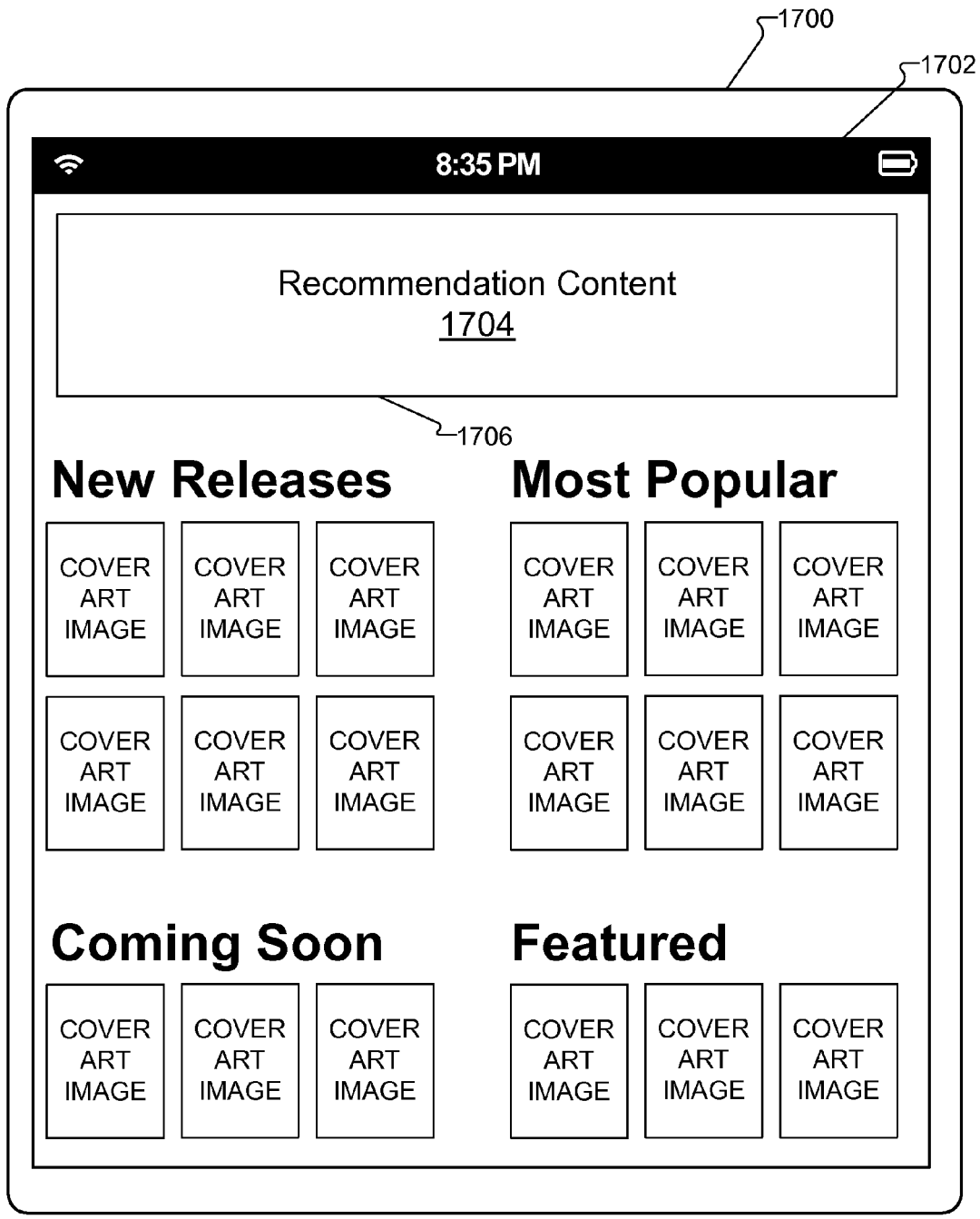
FIG. 17 illustrates a display of an exemplary graphical user interface view according to principles described herein.

Feature facility 306 may be configured provide a determined media program recommendation (e.g., to one or more users) to recommend one or more media programs. Feature facility 306 may recommend one or more media programs to one or more users in any suitable way. As an example, FIG. 17 illustrates a top-level menu page of a media service graphical user interface displayed on a display screen 1702 of a user computing device 1700. The page may be as the top-level menu page shown in FIG. 15 except that the page now includes recommendation content 1704 in a promotional area 1706 prominently displayed on the landing page. Recommendation content 1704 may include any content that recommends one or more media programs to a user, where the one or more media programs have been selected by feature facility 306 based on scene tags of one or more users as described above. Recommendation content 1704 may include one more options configured to be selected by the user to access a media program and/or additional information and/or options for the media program recommended by the recommendation content 1704.

In certain examples, system 300 may be configured to provide data representative of scene tags, favorite scenes (e.g., a set of favorite scenes), promotional content 1504, and/or recommendation content 1704 for use outside of the media service (e.g., for syndicated use). For example, system 300 may be configured to provide such data for syndicated use in a service (or other application) that is separate from the media service (e.g., a service provided by a different service provider, a service provided by way of a different platform and/or computing system, etc.). For instance, system 300 may be configured to provide such data to a social networking service for syndicated use within the social networking service. As an example, data representative of a scene tag provided by a user of the media service may be provided to a social networking service for automatic posting related to the user (e.g., such as by posting an indication of the scene tag on a page, on a virtual wall, on a timeline, or by messaging associated with the user). As another example, data representative of a set of favorite scenes may be provided to a social networking service for automatic posting (e.g., to promote the favorite scenes and/or associated media programs, such as by compiling favorite scenes into a movie trailer and sharing the movie trailer) within the social networking service. The social networking service may provide a link to a user interface within the media service, which may facilitate user access to favorite scenes and/or associated media programs through the social networking service.

As another example, data representative of tagged scenes (e.g., a set of favorite scenes) may be provided to a video sharing service and posted on a particular channel associated with the media service or a user of the media service (e.g., a YouTube channel or a schedule-based subscription television service channel). For example, the media service may be associated with a channel, and system 300 may provide data representative of a set of favorite scenes for transmission and user access on the channel.

As another example, a user of the media service may be able to share scene tags (e.g., any of the user's scene tags) and/or favorite scenes with a specific person within or outside of the media service. For instance, the user may use a feature provided by feature facility 306 to share tags and/or scenes with another user of the media service. Additionally or alternatively, the user may use a feature provided by feature facility 306 to share tags and/or scenes with a person who is not user of the media service, such as by way of a social networking service.

Figure 18:
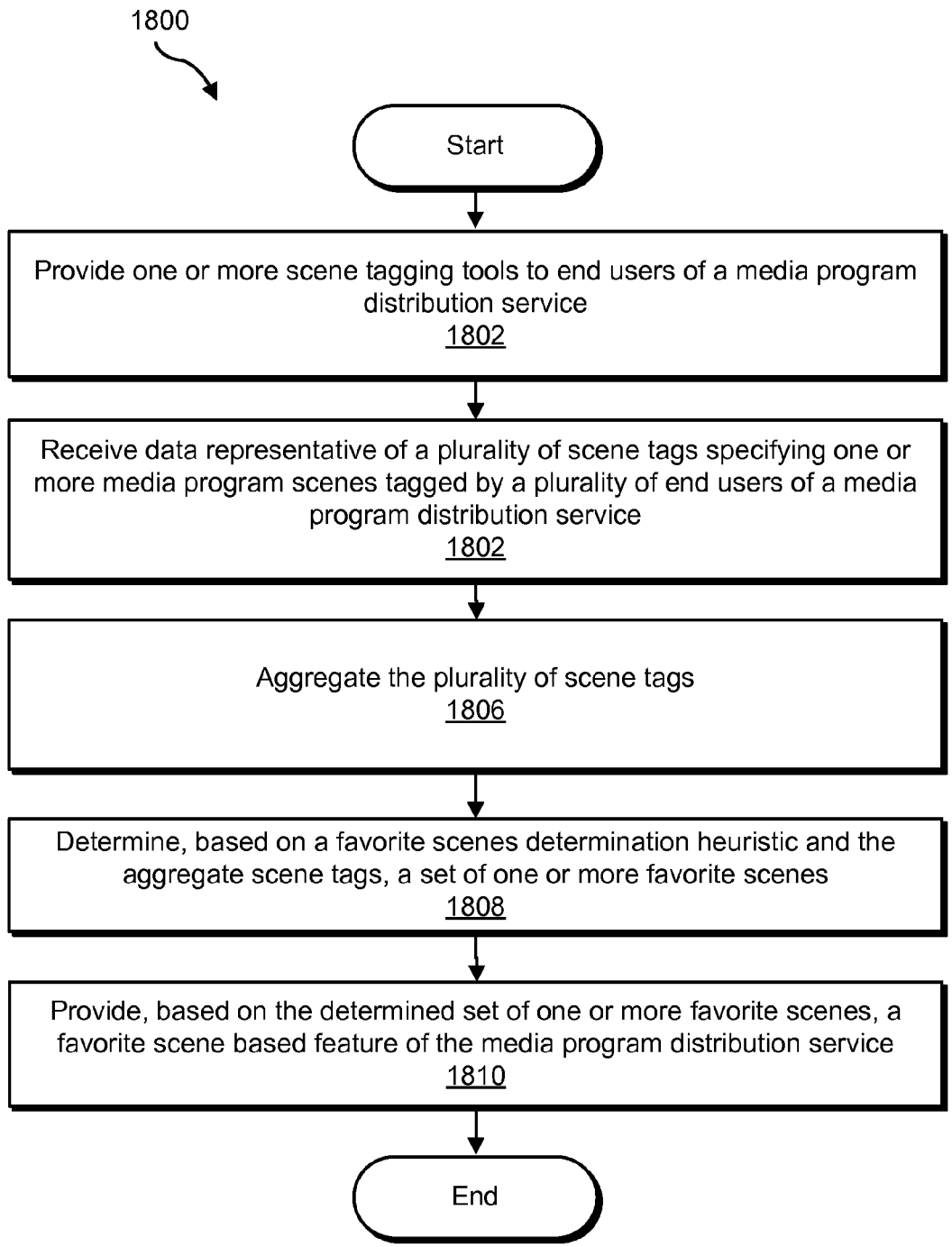
FIGS. 18-19 illustrate exemplary methods according to principles described herein.
Figure 19:
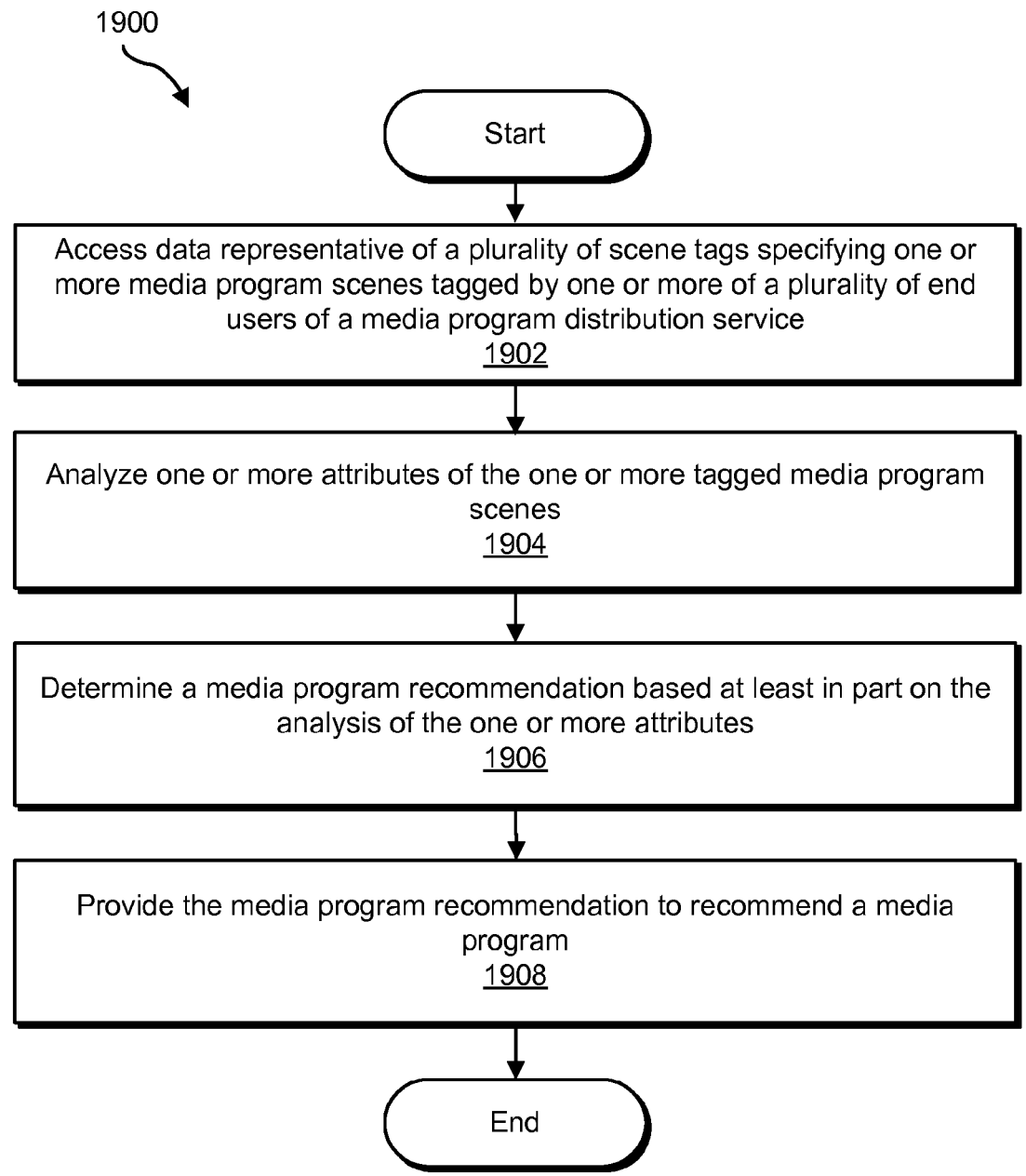

FIGS. 18-19 illustrate exemplary methods 1800 and 1900, respectively, according to principles described herein. While FIGS. 18-19 illustrate exemplary steps according to certain embodiments, other embodiments may omit, add to, reorder, combine, and/or modify any of the steps shown in FIGS. 18-19. In certain embodiments, one or more of the steps shown in FIGS. 18-19 may be performed by system 100, system 300, and/or one or more components or implementations of system 100 and/or system 300.

Turning to FIG. 18, in step 1802 of method 1800, a system (e.g., system 100 or 300) provides one or more scene tagging tools to end users of a media program distribution service, such as described herein.

In step 1804, the system receives data representative of a plurality of scene tags specifying one or more media program scenes tagged by a plurality of end users of the media program distribution service, such as described herein.

In step 1806, the system aggregates the plurality of scene tags, such as described herein.

In step 1808, the system determines a set of one or more favorite scene tags based on a favorite scenes determination heuristic and the aggregate scene tags, such as described herein.

In step 1810, the system provides, based on the determined set of one or more favorite scenes, a favorite scene based feature of the media program distribution service, such as described herein.

Turning to FIG. 19, in step 1902 of method 1900, a system (e.g., system 100 or 300) accesses data representative of a plurality of scene tags specifying one or more media program scenes tagged by one or more of a plurality of end users of a media program distribution service, such as described herein.

In step 1904, the system analyzes one or more attributes of the one or more tagged media program scenes, such as described herein.

In step 1906, the system determines a media program recommendation based at least in part on the analysis of the one or more attributes, such as described herein.

In step 1908, the system provides the media program recommendation to recommend a media program (e.g., to a user), such as described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 20:
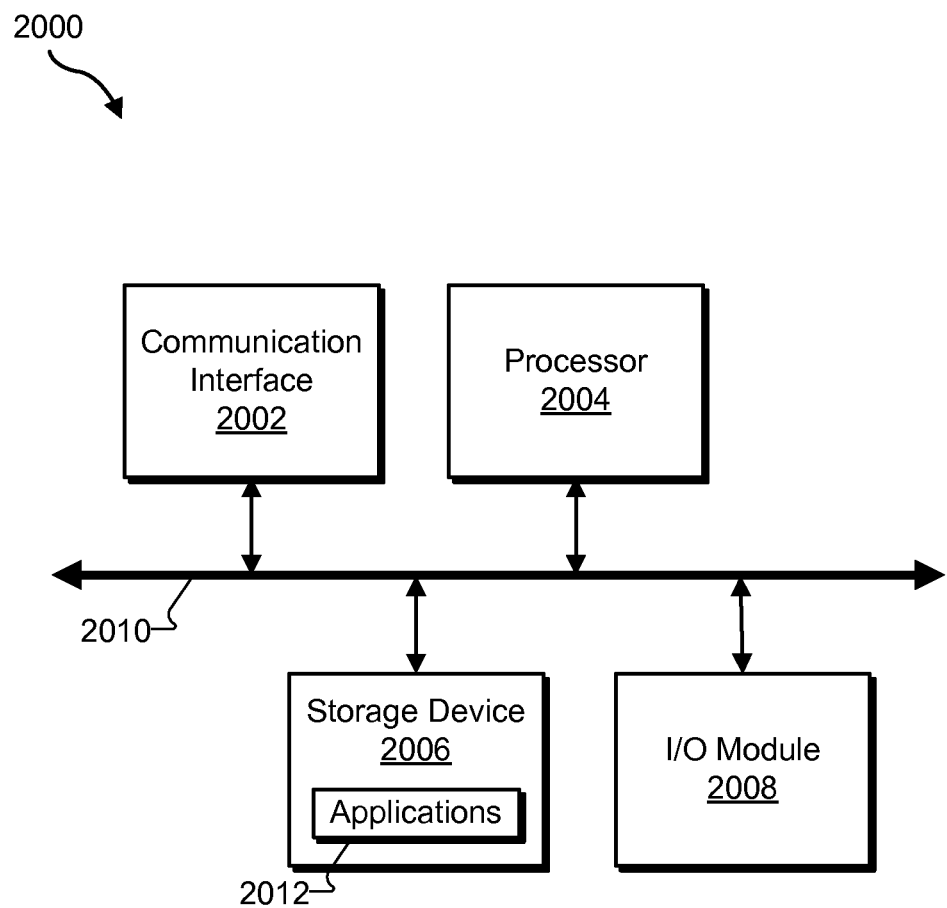
FIG. 20 illustrates an exemplary computing device according to principles described herein.

FIG. 20 illustrates an exemplary computing device 2000 that may be configured to perform one or more of the processes described herein. As shown in FIG. 20, computing device 2000 may include a communication interface 2002, a processor 2004, a storage device 2006, and an input/output ("I/O") module 2008 communicatively connected via a communication infrastructure 2010. While an exemplary computing device 2000 is shown in FIG. 20, the components illustrated in FIG. 20 are not intended to be limiting. Additional or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, and any other suitable interface. Communication interface 2002 may additionally or alternatively provide such a connection through, for example, a local area network (such as an Ethernet network), a personal area network, a telephone or cable network, a satellite data connection, a dedicated URL, an Internet access network, or any other suitable connection. Communication interface 2002 may be configured to interface with any suitable communication media, protocols, and formats.

Processor 2004 generally represents any type or form of processing unit capable of processing data or interpreting, executing, and/or directing execution of one or more of the instructions, processes, and/or operations described herein. Processor 2004 may direct execution of operations in accordance with one or more applications 2012 or other computer-executable instructions such as may be stored in storage device 2006 or another non-transitory computer-readable medium.

Storage device 2006 may include one or more data storage media, devices, or configurations and may employ any type, form, and combination of data storage media and/or device. For example, storage device 2006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2006. For example, data representative of one or more executable applications 2012 (which may include, but are not limited to, one or more of the software applications described herein) configured to direct processor 2004 to perform any of the operations described herein may be stored within storage device 2006. In some examples, data may be arranged in one or more databases residing within storage device 2006.

I/O module 2008 may be configured to receive user input and provide user output and may include any hardware, firmware, software, or combination thereof supportive of input and output capabilities. For example, I/O module 2008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 2000. For example, one or more applications 2012 residing within storage device 2006 may be configured to direct processor 2004 to perform one or more processes or functions associated with one or more of the systems and/or facilities described herein. Likewise, any of the storage facilities described herein may be implemented by or within storage device 2006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a media program distribution service system that provides a media program distribution service to a plurality of end users, data representative of a plurality of scene tags specifying media program scenes tagged by the plurality of end users of the media program distribution service;
aggregating, by the media program distribution service system, the plurality of scene tags;
determining, by the media program distribution service system based on a favorite scenes determination heuristic and the aggregate scene tags, a set of favorite scenes that are most popular among the plurality of end users of the media program distribution service; and
providing, by the media program distribution service system based on the determined set of favorite scenes, a favorite scene based feature of the media program distribution service, the providing of the favorite scene based feature of the media program distribution service comprising providing, in response to a user input associated with a favorite scenes option provided for display in a graphical user interface view that includes information for a single media program, for concurrent display in an additional graphical user interface view,
menu objects representing a subset of scenes included in the set of favorite scenes that are included in only the single media program,
an individual playback option for each scene included in the subset of the scenes,
a playlist playback option configured to be selected to initiate playback of all of the subset of the scenes, and
information indicating, for each scene included in the subset of scenes represented by the menu objects in the additional graphical user interface view, a number of scene tags received from the plurality of end users of the media program distribution service.

2. The method of claim 1, wherein the determining comprises determining, based on the favorite scenes determination heuristic and the aggregate scene tags, that the favorite scenes included in the set of favorite scenes are more popular among the plurality of users than are one or more other scenes included in the single media program.

3. The method of claim 1, wherein the favorite scenes in the set of favorite scenes are included in a plurality of media programs.

4. The method of claim 3, wherein the determining comprises determining, based on the favorite scenes determination heuristic and the aggregate scene tags, that the favorite scenes included in the set of favorite scenes are more popular among the plurality of users than are one or more other scenes included in the plurality of media programs.

5. The method of claim 4, wherein the plurality of media programs are included in a single category of media programs.

6. The method of claim 1, wherein:
the favorite scenes determination heuristic specifies at least one of a quantity of favorite scenes condition, a maximum duration condition, a minimum number of votes condition, and a time window condition; and
the determining of the set of favorite scenes is based on the at least one of the quantity of favorite scenes condition, the maximum duration condition, the minimum number of votes condition, and the time window condition.

7. The method of claim 1, wherein the providing of the favorite scenes based feature of the media program distribution service further comprises promoting at least one of the favorite scenes within the media program distribution service.

8. The method of claim 7, wherein the promoting comprises providing, for display in a further graphical user interface view, promotional content that promotes the at least one of the favorite scenes, the promotional content comprising at least one user selectable option that facilitates access to the at least one of the favorite scenes.

9. The method of claim 8, wherein the providing of the promotional content for display in the further graphical user interface view comprises providing the promotional content for display within a top-level menu page of the graphical user interface.

10. The method of claim 1, wherein the providing of the favorite scenes based feature of the media program distribution service further comprises promoting, within the media program distribution service, at least one media program that contains at least one of the favorite scenes.

11. The method of claim 10, wherein the promoting comprises providing, for display in a further graphical user interface view, promotional content that promotes the at least one media program, the promotional content comprising at least one user selectable option-that facilitates access to the at least one media program.

12. The method of claim 11, wherein the providing of the promotional content for display in the further graphical user interface view comprises providing the promotional content for display within a top-level menu page of the graphical user interface.

13. The method of claim 1, wherein the providing of the favorite scenes based feature of the media program distribution service further comprises:
analyzing one or more attributes of the favorite scenes included in the set of favorite scenes;
determining a media program recommendation based on the one or more attributes of the favorite scenes; and
providing the media program recommendation to recommend a media program.

14. The method of claim 1, further comprising providing data representative of the set of favorite scenes for syndicated use by a service that is separate from the media program distribution service.

15. The method of claim 1, embodied as computer-executable instructions on at least one non-transitory computer-readable medium.

16. A system comprising:

at least one computing device;

a scene tags facility that directs the at least one computing device to receive data representative of a plurality of scene tags specifying media program scenes tagged by a plurality of end users of a media program distribution service, and aggregate the plurality of scene tags;

a favorite scenes management facility that directs the at least one computing device to determine, based on a favorite scenes determination heuristic and the aggregate scene tags, a set of favorite scenes that are most popular among the plurality of end users of the media program distribution service; and a feature facility that directs the at least one computing device to provide, based on the determined set of favorite scenes, a favorite scene based feature of the media program distribution service by providing, in response to a user input associated with a favorite scenes option provided for display in a graphical user interface view that includes information for a single media program, for concurrent display in an additional graphical user interface view, menu objects representing a subset of scenes included in the set of favorite scenes that are included in only the single media program, an individual playback option for each scene included in the subset of the scenes, a playlist playback option configured to be selected to initiate playback of all of the subset of the scenes, and information indicating, for each scene included in the subset of the scenes represented by the menu objects in the additional graphical user interface view, a number of scene tags received from the plurality of end users of the media program distribution service.

17. A method comprising:

accessing, by a media program distribution service system that provides a media program distribution service to a plurality of end users, data representative of a plurality of scene tags specifying media program scenes tagged by an end user included in the plurality of end users of the media program distribution service;

providing, by the media program distribution service system based on the data representative of the plurality of scene tags, a favorite scene based feature of the media program distribution service, the providing of the favorite scene based feature of the media program distribution service comprising providing, in response to a user input associated with a favorite scenes option provided for display in a graphical user interface view that includes information for a single media program, for concurrent display in an additional graphical user interface view, menu objects representing a subset of scenes included in a set of favorite scenes that are from only the single media program and that have been tagged as favorite scenes by the plurality of end users, an individual playback option for each scene included in the subset of the scenes, a playlist playback option configured to be selected to initiate playback of all of the subset of the scenes, and information indicating, for each scene included in the subset of the scenes represented by the menu objects in the additional graphical user interface view, a number of scene tags received from the plurality of end users of the media program distribution service.

18. The method of claim 17, further comprising:

accessing, by the media program distribution service system, data representative of a plurality of additional scene tags specifying media program scenes tagged by additional end users included in the plurality of end users of the media program distribution service;

aggregating, by the media program distribution service system, the plurality of additional scene tags;

determining, by the media program distribution service system based on a favorite scenes determination heuristic and the aggregate scene tags, the set of favorite scenes.

19. The method of claim 1, wherein the subset of the scenes represented by the menu objects are arranged in chronological order in the additional graphical user interface view.

* * * * *